United States Patent
Kwon et al.

(10) Patent No.: US 10,028,324 B2
(45) Date of Patent: Jul. 17, 2018

(54) METHOD AND DEVICE FOR CONTROLLING DEVICE BY USING BLUETOOTH LOW ENERGY (LE) TECHNOLOGY

(71) Applicant: LG ELECTRONICS INC., Seoul (KR)

(72) Inventors: Younghwan Kwon, Seoul (KR); Minsoo Lee, Seoul (KR); Jingu Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/508,394

(22) PCT Filed: Sep. 2, 2015

(86) PCT No.: PCT/KR2015/009251
§ 371 (c)(1),
(2) Date: Mar. 2, 2017

(87) PCT Pub. No.: WO2016/036139
PCT Pub. Date: Mar. 10, 2016

(65) Prior Publication Data
US 2017/0303326 A1    Oct. 19, 2017

Related U.S. Application Data

(60) Provisional application No. 62/044,955, filed on Sep. 2, 2014, provisional application No. 62/046,125, filed on Sep. 4, 2014.

(51) Int. Cl.
*H04B 7/00* (2006.01)
*H04W 76/14* (2018.01)
*H04W 76/02* (2009.01)
*H04W 4/00* (2018.01)
*H04W 4/80* (2018.01)

(52) U.S. Cl.
CPC ............ *H04W 76/14* (2018.02); *H04W 4/008* (2013.01); *H04W 4/80* (2018.02); *H04W 76/023* (2013.01)

(58) Field of Classification Search
CPC ............................ H04W 4/008; H04W 76/023
USPC .................................................. 455/41.1, 41.2
See application file for complete search history.

(56) References Cited

U.S. PATENT DOCUMENTS

| | | | |
|---|---|---|---|
| 2011/0021142 A1 | 1/2011 | Desai et al. | |
| 2011/0021143 A1* | 1/2011 | Kapur | H04L 63/0464 455/41.2 |
| 2013/0259230 A1 | 10/2013 | Polo et al. | |

(Continued)

*Primary Examiner* — Ayodeji Ayotunde
(74) *Attorney, Agent, or Firm* — Birch, Stewart, Kolasch & Birch, LLP

(57) ABSTRACT

Disclosed is a method and device for controlling a connection between a first device and a second device by using Bluetooth LE (Low Energy) technology. The method comprises: receiving from the first device an advertising message including information related to a connection control service; connecting with the first device based on the advertising message; and requesting the first device to write in the characteristics of the first device in order to instruct to perform a specific operation, wherein the advertising message includes at least one of role information indicating a role of the first device, bonding information indicating a bonding state, or connection information indicating a connection state.

18 Claims, 44 Drawing Sheets

(56) References Cited

U.S. PATENT DOCUMENTS

| | | | |
|---|---|---|---|
| 2013/0316649 A1* | 11/2013 | Newham | H04W 88/04 |
| | | | 455/41.2 |
| 2014/0094123 A1 | 4/2014 | Polo et al. | |
| 2014/0188348 A1* | 7/2014 | Gautama | B60W 10/30 |
| | | | 701/48 |

* cited by examiner

[FIG. 1]
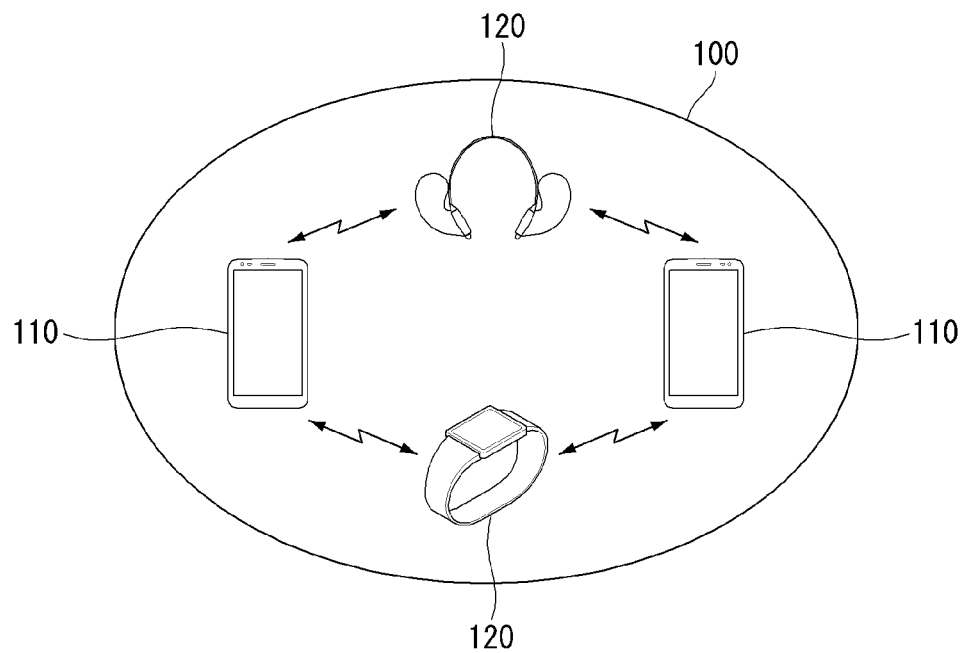

[FIG. 2]
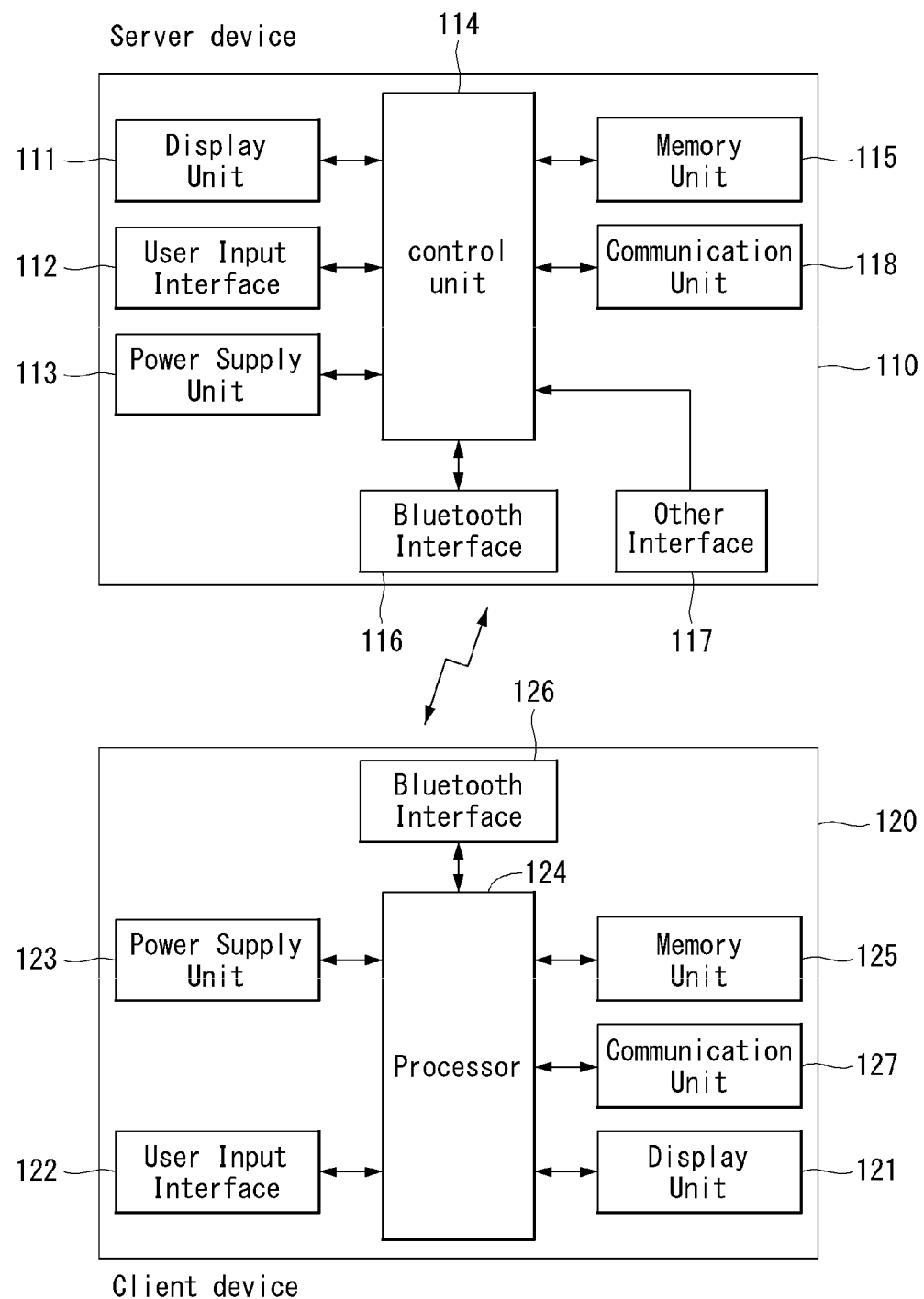

[FIG. 3]
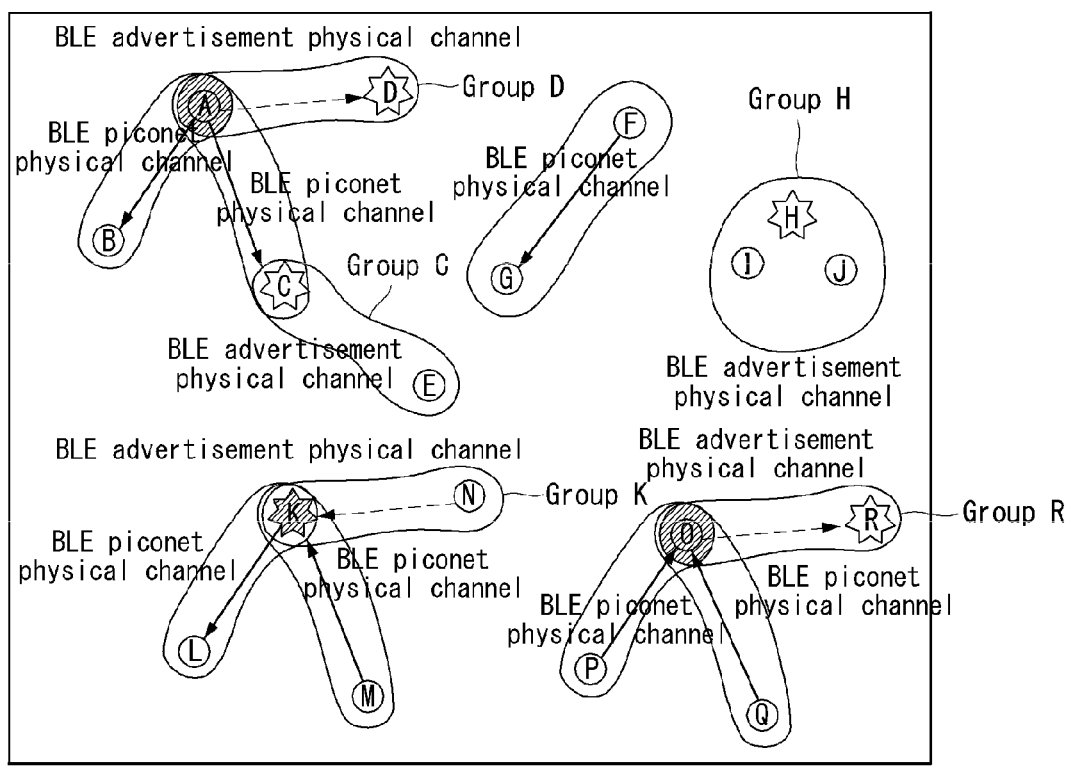

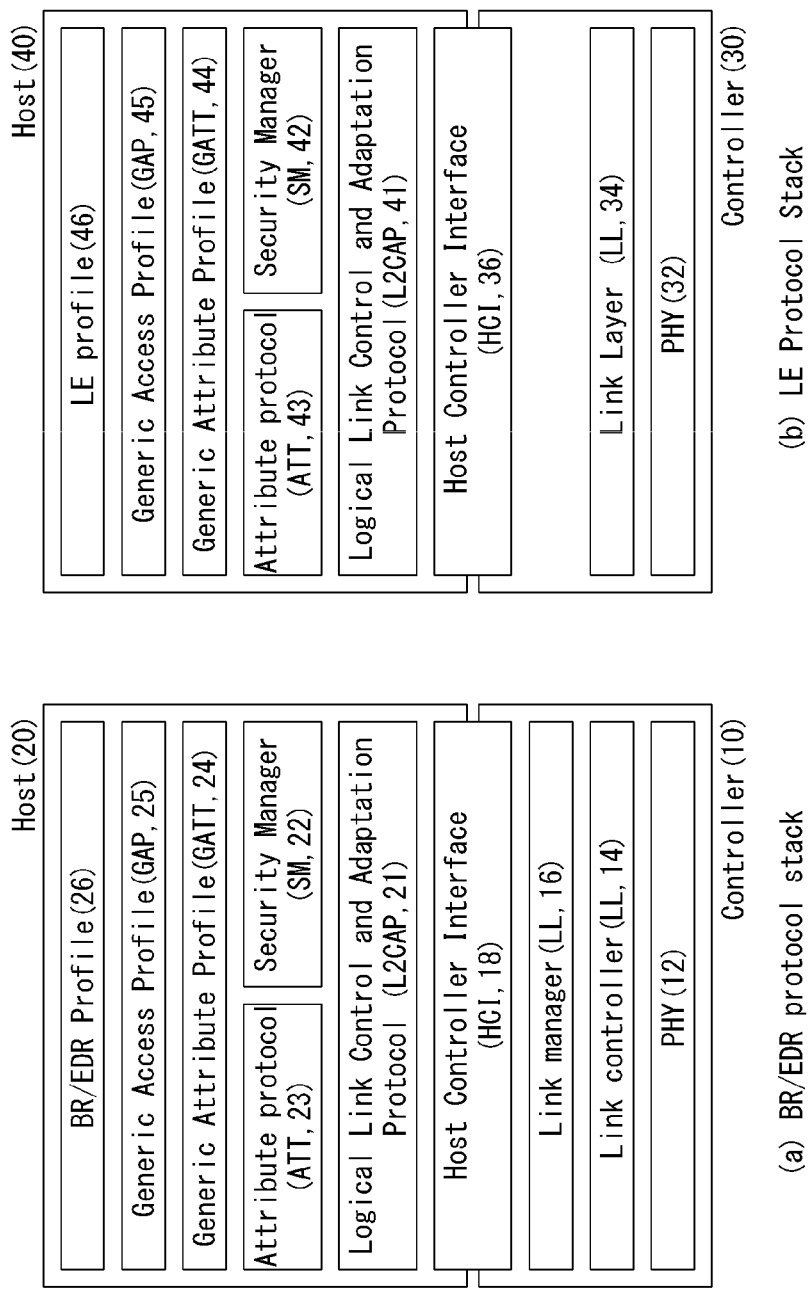
[FIG. 4]

[FIG. 5]
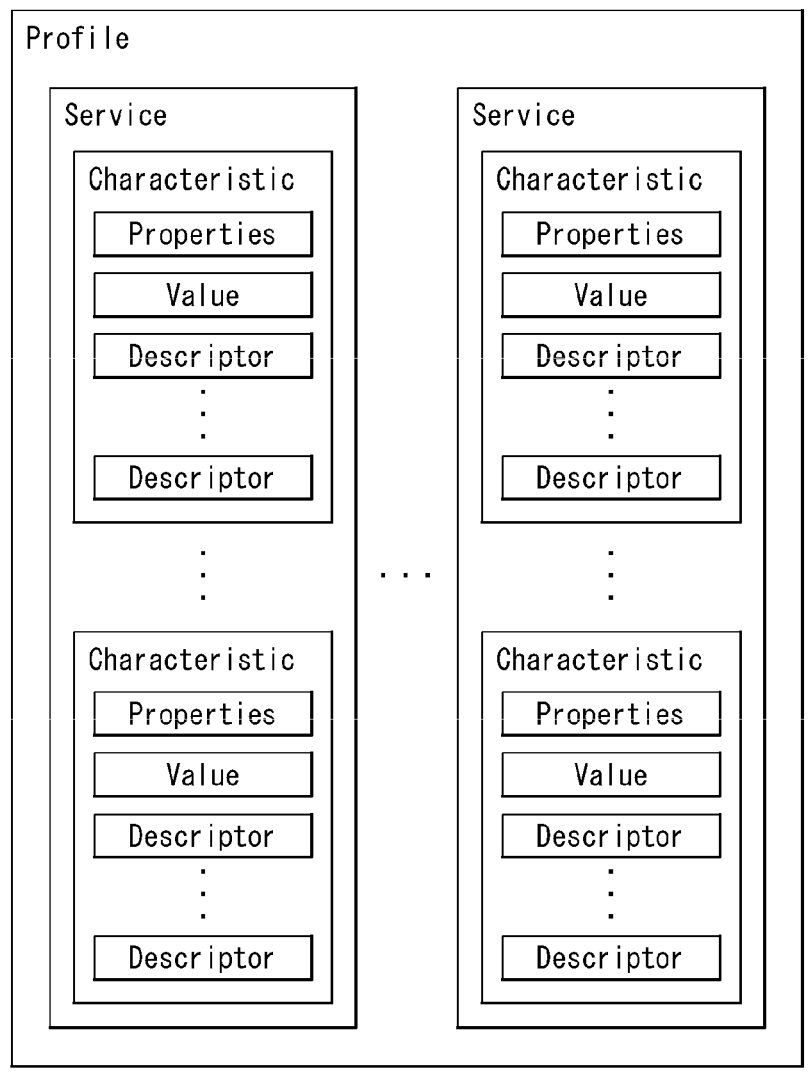

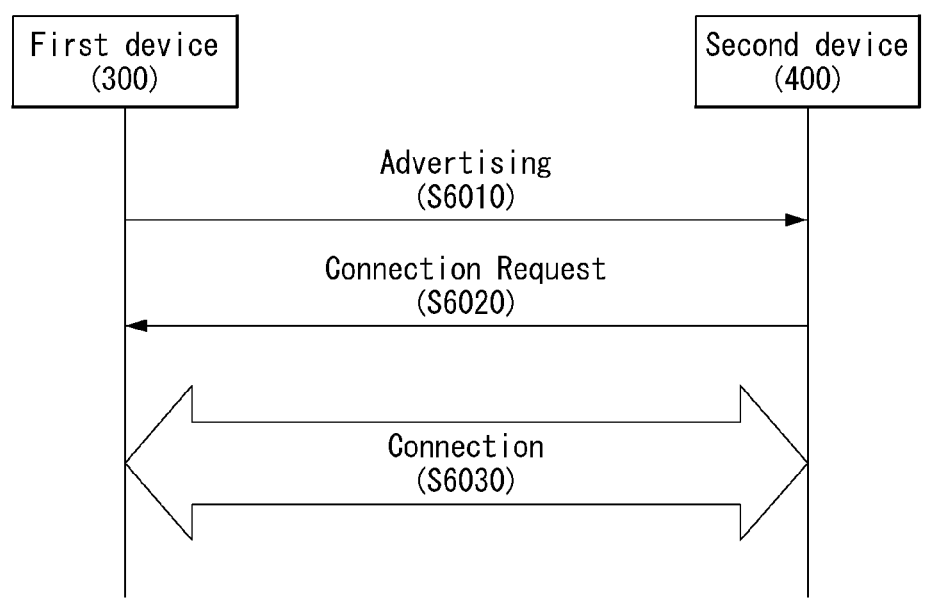
[FIG. 6]

[FIG. 7]
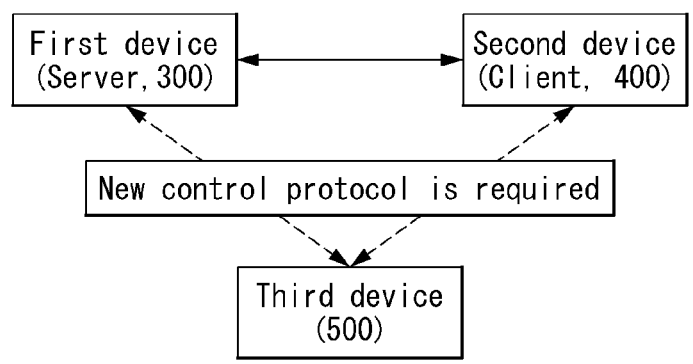

[FIG. 8]

| Characteristic Name | Requirement | Mandatory Properties |
|---|---|---|
| Peer Device | M | Read, Write, Indication |
| Agent Device |  | Read, Write, Indication |
| Group Info | O | Read, Write, Indication |
| Device State | M | Read, Write, Indication |
| Pairing/Connection Control Point | M | Write, Indication |
| Connection Status | O | Read, Indication |
| WhiteList | O | Read, Write, Indication |
| WhiteList Control Point | O | Read, Write, Indication |
| Bondable | O | Read, Write |
| Security | O | Read, Write |
| Connected Tech Type | O | Read, Write |
| Service Type | O | Read, Write |
| Passkey |  | Read, Write |
| Scheduled Time |  | Read, Write |

Charcteristic

[FIG. 9]

| Data Type | Type | Description |
|---|---|---|
| Public Device Address | 48 bits integer | Original address of the device |
| Random Device address | 48 bits integer | Random address selected by the device |
| Resolvable Address | 48 bits integer | Address encrypted by LE Privacy |
| Non-Resolvable Address | 48 bits integer | Unencrypted address |
| Bluetooth Device Name | string | Controlled Device friendly Name that is set by the device user |

(a) Peer Device

| Data Type | Type | Description |
|---|---|---|
| Public Device Address | 48 bits integer | Original address of the device |
| Random Device address | 48 bits integer | Random address selected by the device |
| Resolvable Address | 48 bits integer | Address encrypted by LE Privacy |
| Non-Resolvable Address | 48 bits integer | Unencrypted address |

(b) Agent Device

| Data Type | Type | Description |
|---|---|---|
| Current Device State | 8 bits integer | Current operating state of device |
| Operated Device States | 8 bits integer | Currently operable states of device |

(a) Device state

| 7th bit | 6th bit | 5th bit | 4th bit | 3th bit | 2th bit | 1th bit | 0th bit |
|---|---|---|---|---|---|---|---|
| Mode | Group | Bondable | Connecting | initiating | Advertising | Standby | Scanning |

(b) Device State format

[FIG. 10]

| 0x01 | 0x02 | 0x03 | 0x04 | 0x05 | 0x06 | 0x07 | 0x08 |
|---|---|---|---|---|---|---|---|
| Execute | Advertising Start | Advertising Stop | Scanning Start | Scanning Stop | Connecting Request | Connecting Stop | Refresh Bonding |

| 0x09 | 0x10 | 0x11 | 0x12 | 0x13 | 0x14 | 0x15 | 0x16 |
|---|---|---|---|---|---|---|---|
| Refresh | Pairing Start | Pairing Stop | Authentication | Encryption | Authentication | | |

Pairing/Connection Control Point

[FIG. 11]

| Current Device State | Peer Device | Connected Tech Type | Service Type | Security | Group Info |
|---|---|---|---|---|---|
| 8 bits integer | BT Address (48 bits) or BT Friendly Name (String) | Technology used for connection (BLE, BR/EDR, WiFi, etc.) | Service type used for connection (BT service or application service (application), etc.) | Security state of current connection (authentication, etc.) | Group ID, Group owner, etc. |

Connection state information

[FIG. 12]

| 0x01 | 0x02 | 0x03 | 0x04 | 0x05 | 0x06 | 0x07 ~ |
|------|------|------|------|------|------|--------|
| BLE | BR/EDR | WiFi | WiFi Display | WiGig | Ethernet | |

(a) Connection Tech Type – 1

| 7th bit | 6th bit | 5th bit | 4th bit | 3th bit | 2th bit | 1th bit | 0th bit |
|---------|---------|---------|---------|---------|---------|---------|---------|
| Reserved for Future Use | | Ethernet | WiGig | WiFi Display | WiFi | BR/EDR | BLE |

(b) Connection Tech Type – 2

[FIG. 13]

| 7th bit | 6th bit | 5th bit | 4th bit | 3rd bit | 2nd bit | 1th bit | 0th bit |
|---------|---------|---------|---------|---------|---------|---------|---------|
|         |         |         |         | Security Mode 4 | Security Mode 3 | Security Mode 2 | Security Mode 1 |

(a) Security Mode

| 7th bit | 6th bit | 5th bit | 4th bit | 3rd bit | 2nd bit | 1th bit | 0th bit |
|---------|---------|---------|---------|---------|---------|---------|---------|
|         |         |         |         |         | Security Mode 3 | Security Mode 2 | Security Mode 1 |

(b) Security Level

| 7th bit | 6th bit | 5th bit | 4th bit | 3rd bit | 2nd bit | 1th bit | 0th bit |
|---------|---------|---------|---------|---------|---------|---------|---------|
| Reserved for Future Use | Security Mode 3 | Security Mode 2 | Security Mode 1 | Security Mode 4 | Security Mode 3 | Security Mode 2 | Security Mode 1 |

(c) Security Information (Security Mode and Security Level)

[FIG. 14]

[FIG. 15]
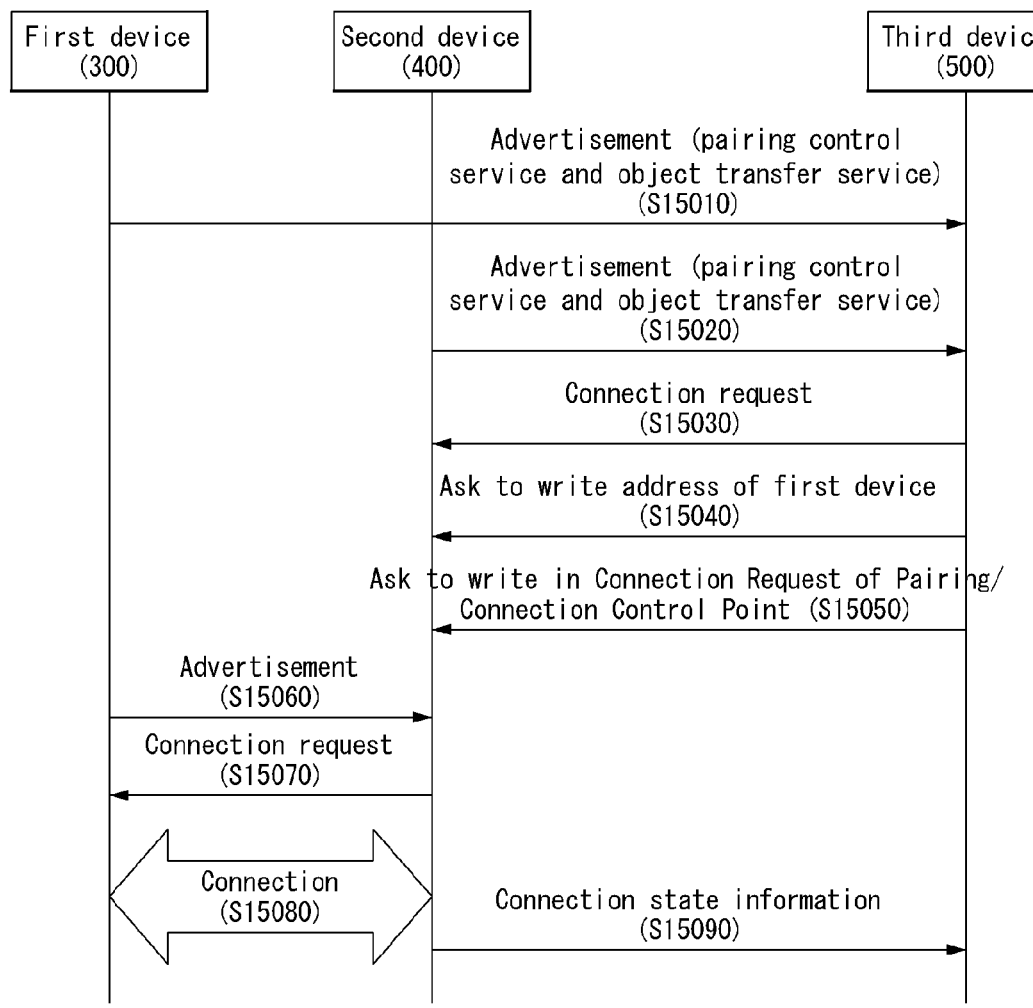

[FIG. 16]
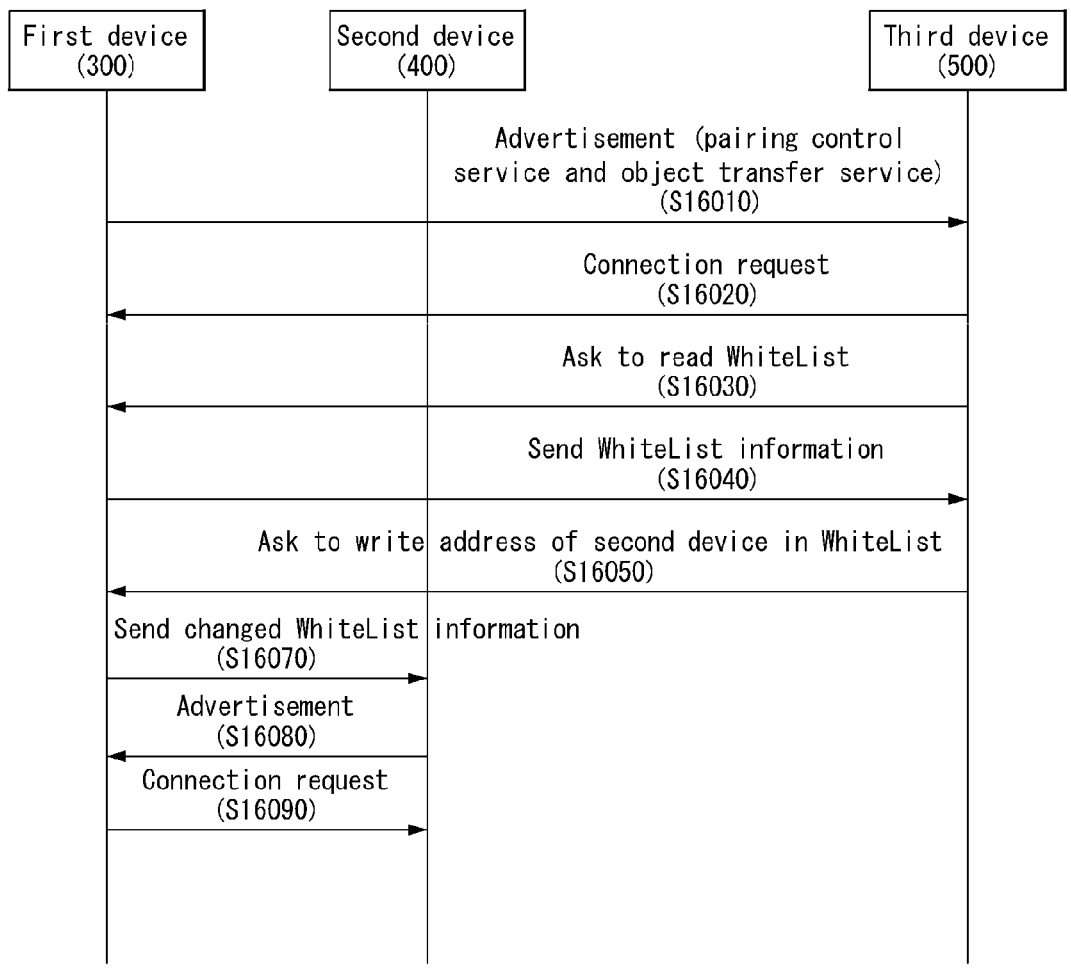

[FIG. 17]
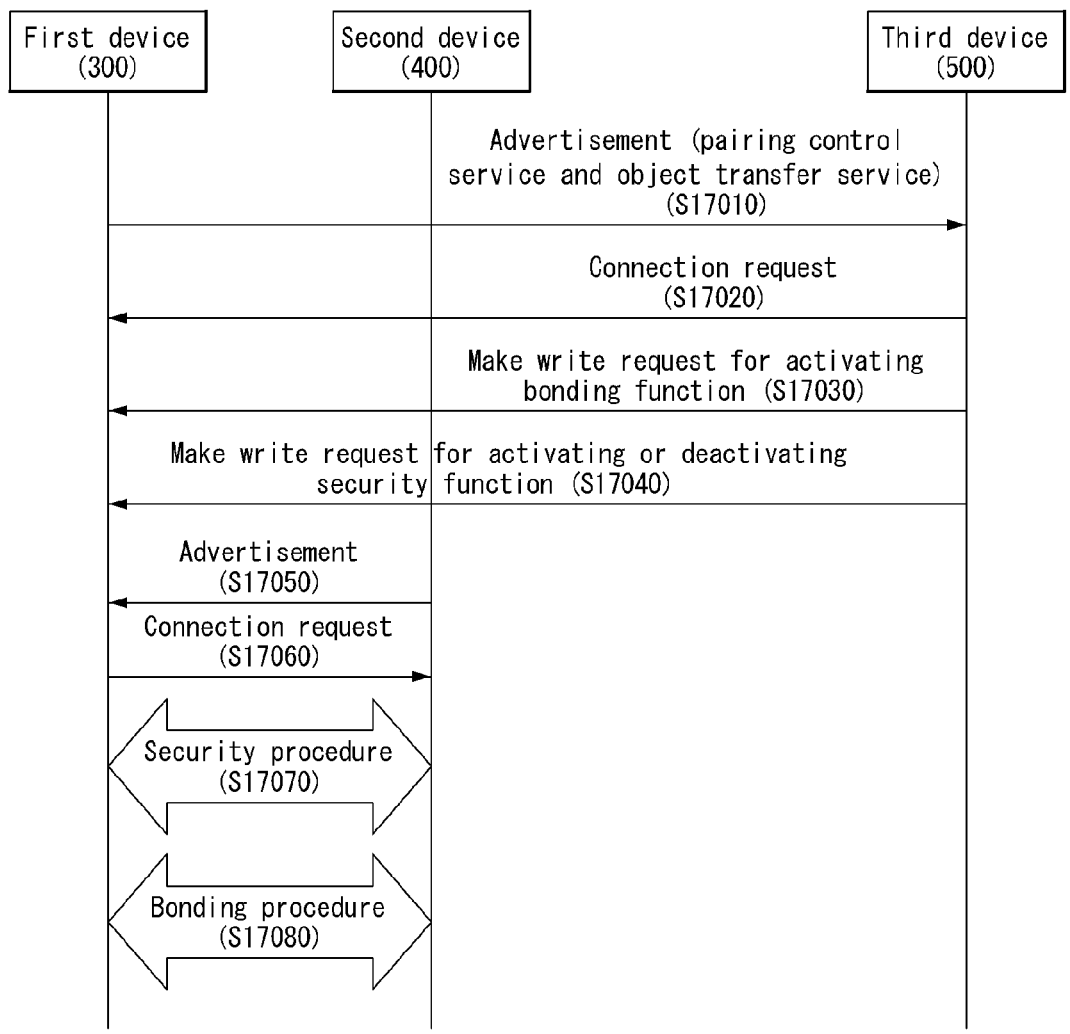

[FIG. 18]
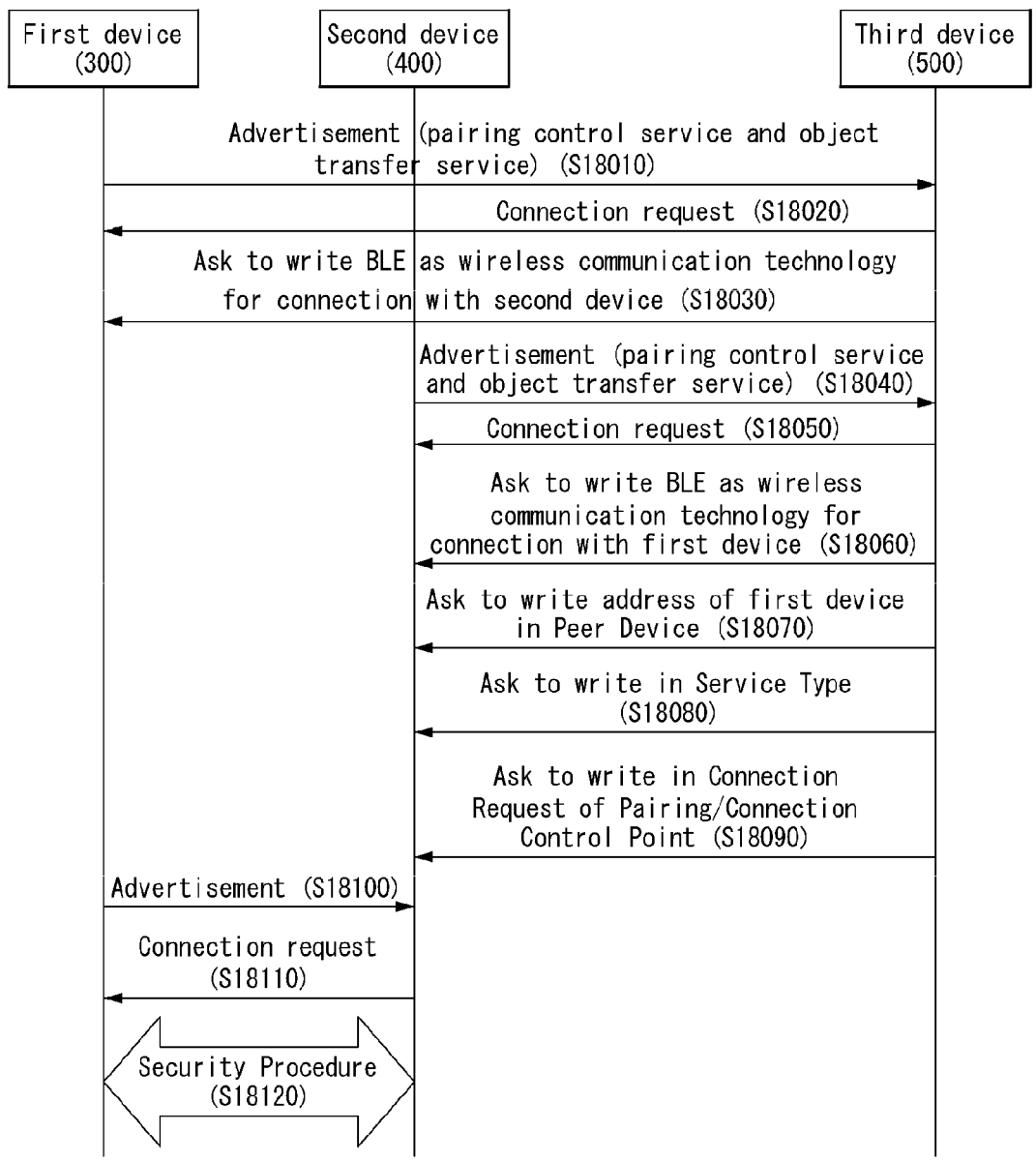

[FIG. 19]
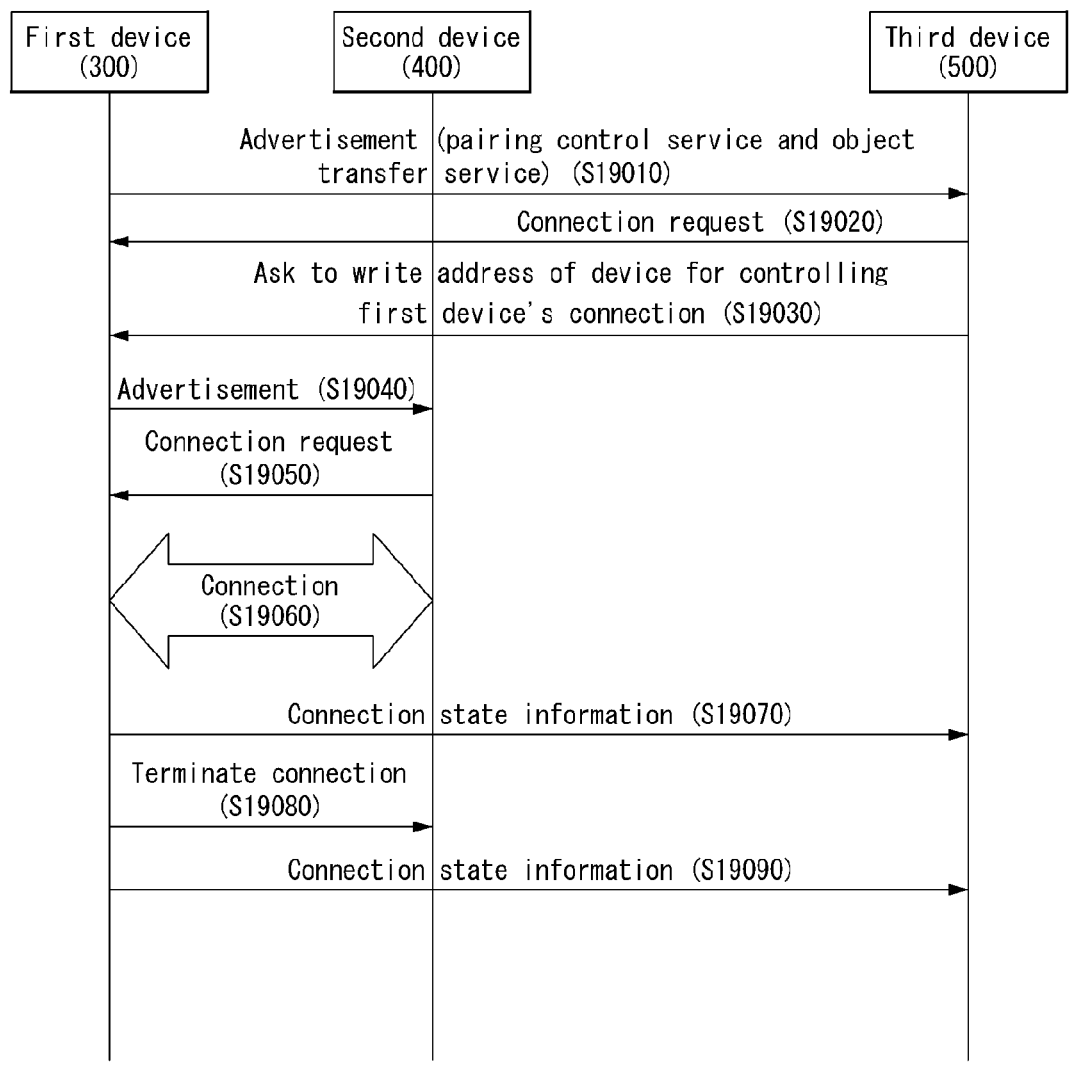

[FIG. 20]
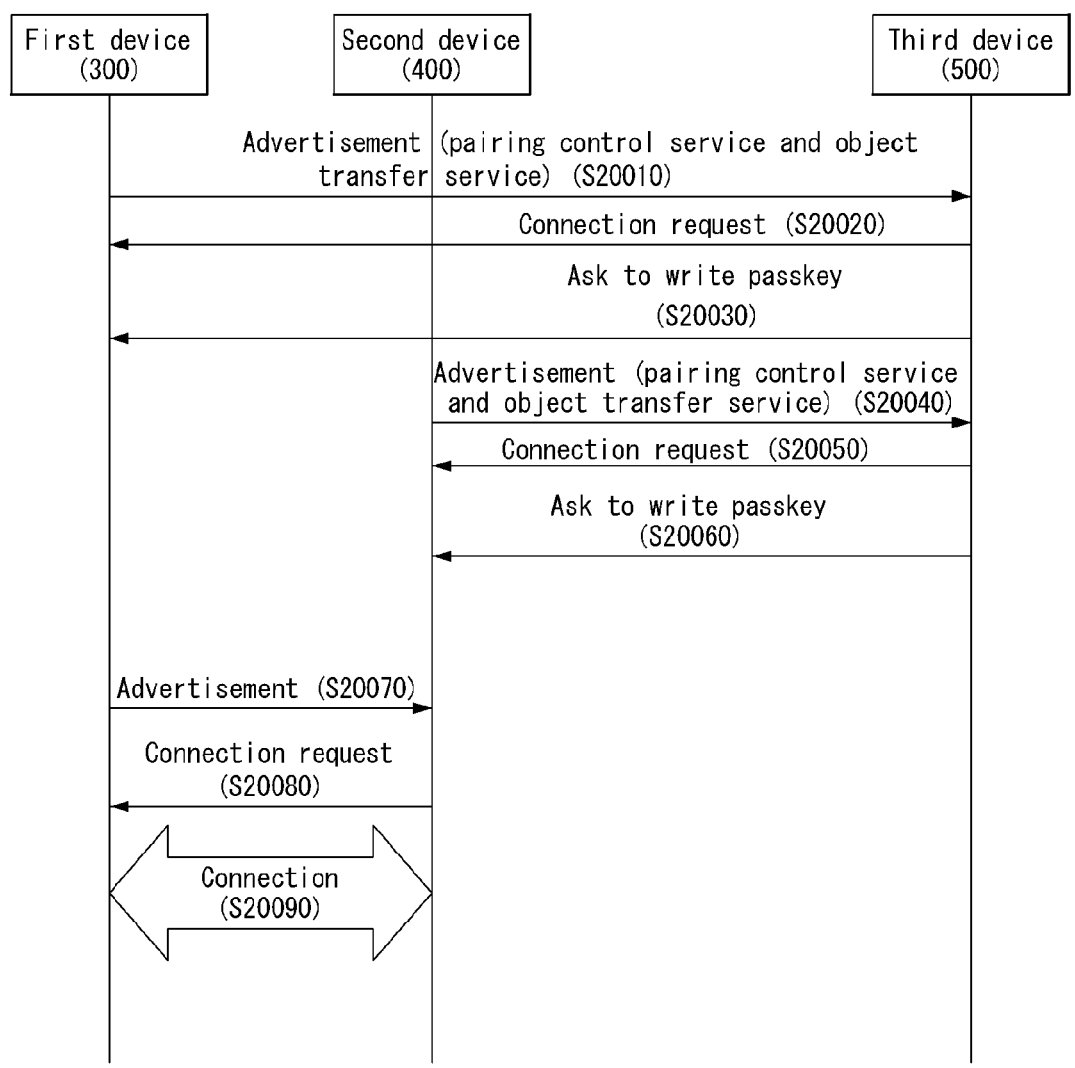

[FIG. 21]
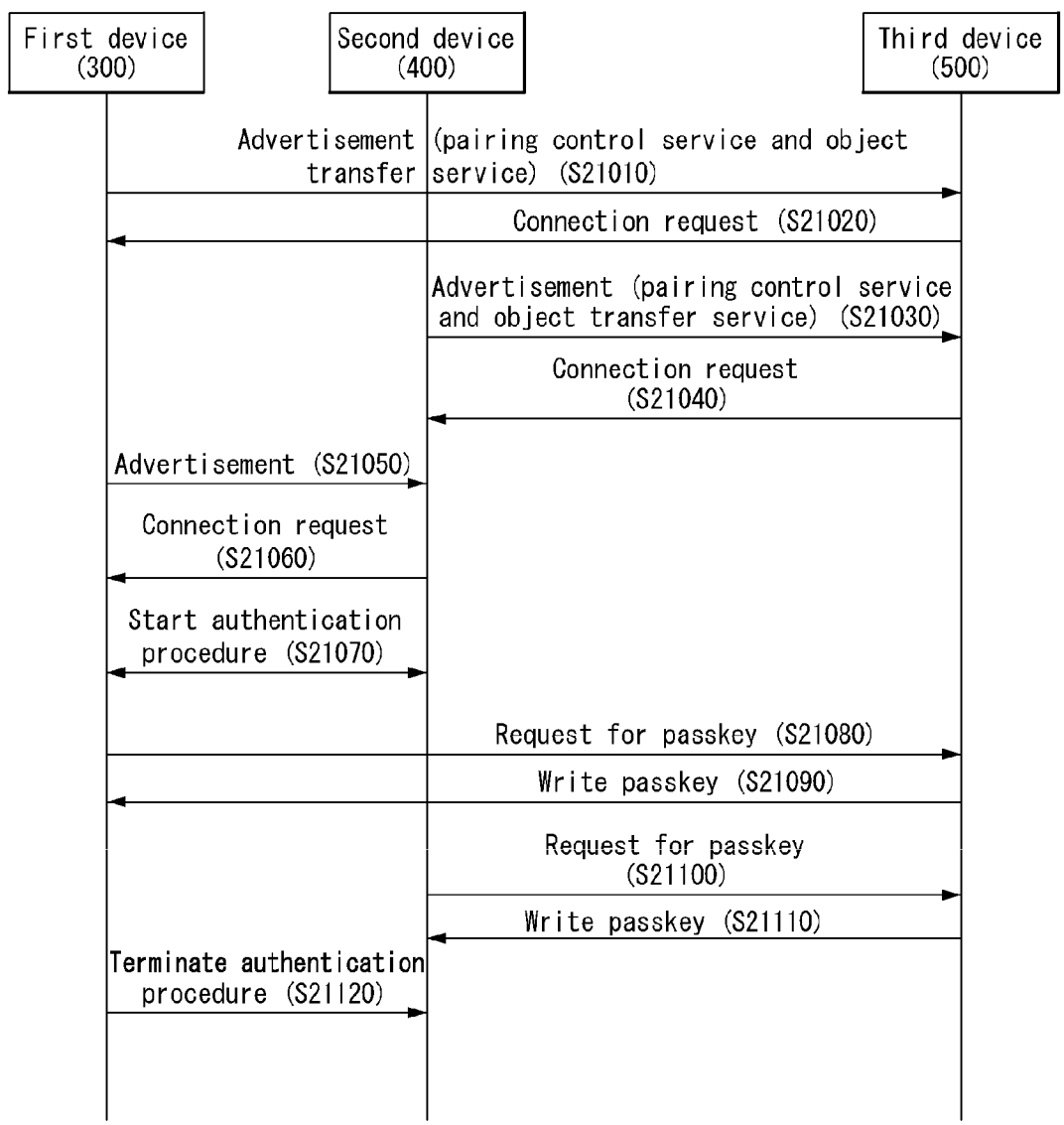

[FIG. 22]
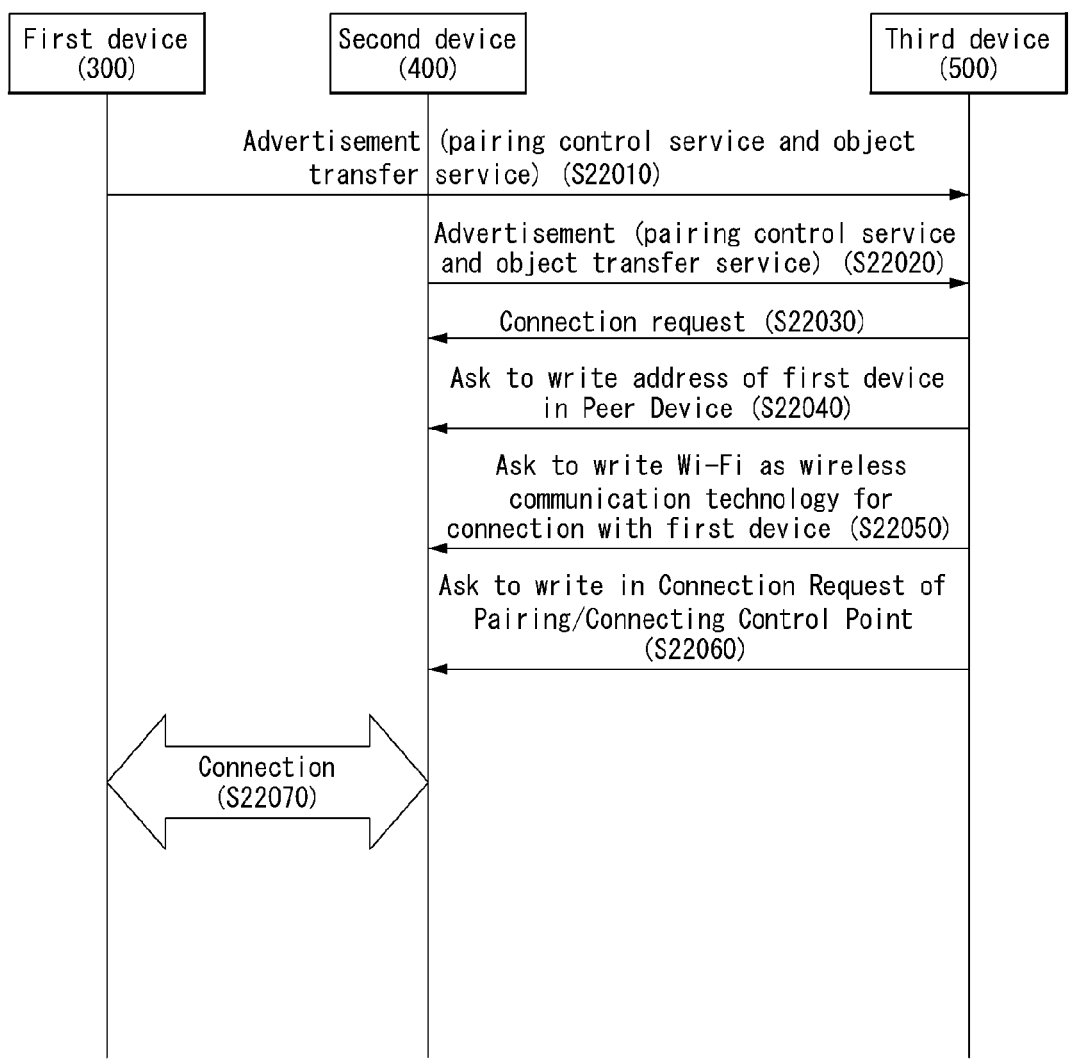

[FIG. 23]
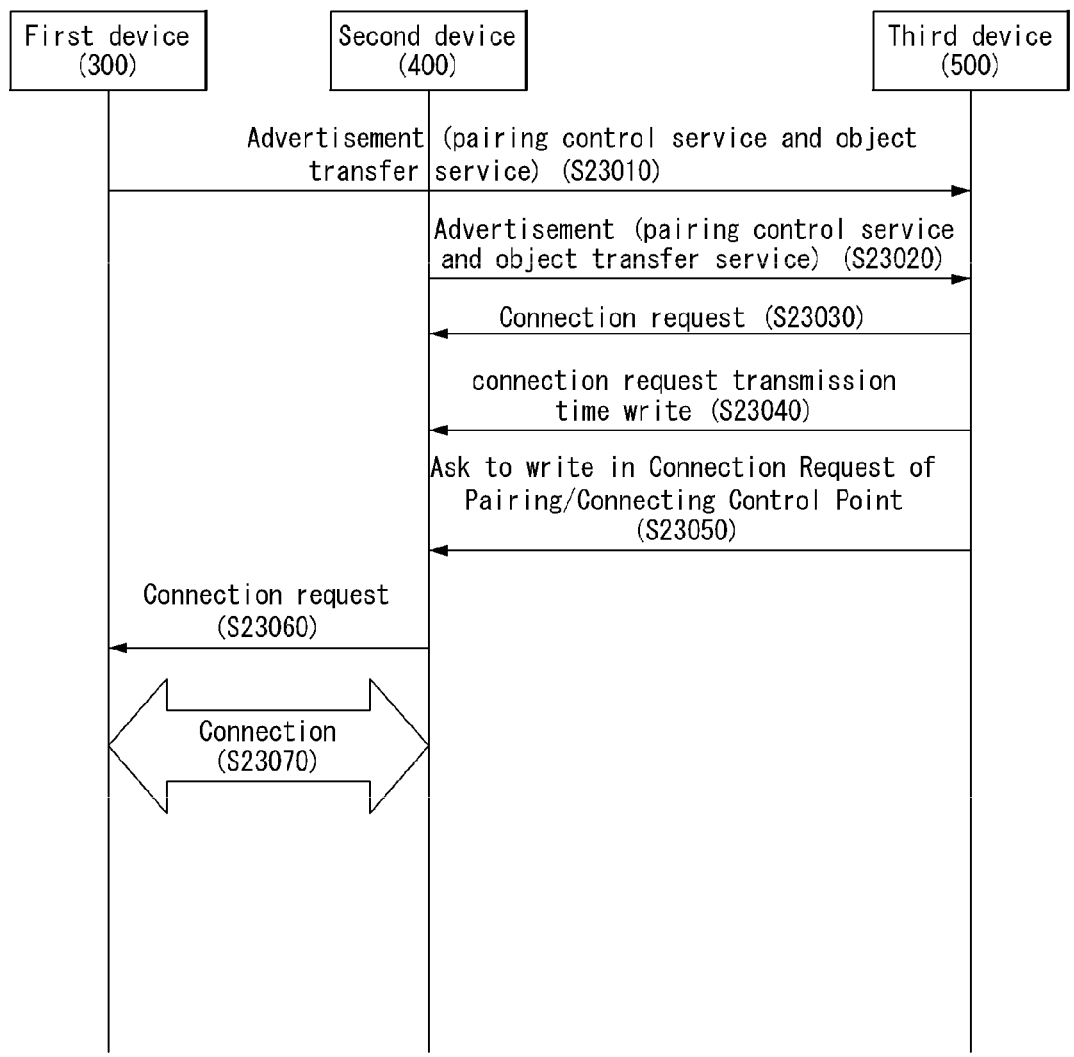

[FIG. 24]

| Data Type | Type | Description |
|---|---|---|
| Public Device Address | 48 bits integer | Original address of the device |
| Random Device address | 48 bits integer | Random address selected by the device |
| Resolvable Address | 48 bits integer | Address encrypted by LE Privacy |
| Non-Resolvable Address | 48 bits integer | Unencrypted address |

Agent Device (a) Device state

| Data Type | Type | Description |
|---|---|---|
| Current Device State | 8 bits integer | Current operating state of device |
| Operated Device States | 8 bits integer | Currently operable states of device |

(b) Device State format

| 7th bit | 6th bit | 5th bit | 4th bit | 3th bit | 2th bit | 1th bit | 0th bit |
|---|---|---|---|---|---|---|---|
| Mode | Group | Bondable | Connecting | initiating | Advertising | Standby | Scanning |

[FIG. 25]

| 7th bit | 6th bit | 5th bit | 4th bit | 3th bit | 2th bit | 1th bit | 0th bit |
|---|---|---|---|---|---|---|---|
| | | | | Security Mode 4 | Security Mode 3 | Security Mode 2 | Security Mode 1 |

(a) Security Mode

| 7th bit | 6th bit | 5th bit | 4th bit | 3th bit | 2th bit | 1th bit | 0th bit |
|---|---|---|---|---|---|---|---|
| | | | | | Security Mode 3 | Security Mode 2 | Security Mode 1 |

(b) Security Level

| 7th bit | 6th bit | 5th bit | 4th bit | 3th bit | 2th bit | 1th bit | 0th bit |
|---|---|---|---|---|---|---|---|
| Reserved for Future Use | Security Mode 3 | Security Mode 2 | Security Mode 1 | Security Mode 4 | Security Mode 3 | Security Mode 2 | Security Mode 1 |

(c) Security Information (Security Mode and Security Level)

[FIG. 26]

| 0x01 | 0x02 | 0x03 | 0x04 | 0x05 | 0x06 | 0x07 ~ |
|------|------|------|------|------|------|--------|
| BLE | BR/EDR | WiFi | WiFi Display | WiGig | Ethernet | |

(a) Connection Tech Type – 1

| 7th bit | 6th bit | 5th bit | 4th bit | 3th bit | 2th bit | 1th bit | 0th bit |
|---------|---------|---------|---------|---------|---------|---------|---------|
| Reserved for Future Use | | Ethernet | WiGig | WiFi Display | WiFi | BR/EDR | BLE |

(b) Connection Tech Type – 2

[FIG. 27]

| 0x01 | 0x02 | 0x03 | 0x04 | 0x05 | 0x06 | 0x07 ~ |
|---|---|---|---|---|---|---|
| Bondable | Non-Bondable | | | | | |

(a) Bonding Mode Information - 1

| 7th bit | 6th bit | 5th bit | 4th bit | 3rd bit | 2nd bit | 1st bit | 0th bit |
|---|---|---|---|---|---|---|---|
| | | | | | | Non-Bondable | Bondable |

(b) Bonding Mode Information - 2

| 1octet | 1octet | 6octets | 6octets | 6octets |
|---|---|---|---|---|
| Bonding List information | Length of Bonding Information | Number of Bonded Devices | Device Address 1 | Device Address 2 | Device Address n |

(c) Bonding Information

| 7th bit | 6th bit | 5th bit | 4th bit | 3rd bit | 2nd bit | 1st bit | 0th bit |
|---|---|---|---|---|---|---|---|
| | | | | | No List | Partial List | Complete List |

(d) Bonding List Information

[FIG. 28]

| 0x01 | 0x02 | 0x03 | 0x04 | 0x05 | 0x06 | 0x07 ~ |
|---|---|---|---|---|---|---|
| Connectable | Non-Connectable | | | | | |

(a) Connection Mode Information −1

| 7th bit | 6th bit | 5th bit | 4th bit | 3rd bit | 2nd bit | 1st bit | 0th bit |
|---|---|---|---|---|---|---|---|
| | | | | | | Non-Connectable | Connectable |

(b) Connection Mode Information − 2

| 1octet | 1octet | 1octet | 6octets | 6octets | 6octets |
|---|---|---|---|---|---|
| Connecting information | Length of Connecting Information | Number of Connecting Devices | Device Address 1 | Device Address 2 | Device Address n |

(c) Connection Information

| 7th bit | 6th bit | 5th bit | 4th bit | 3rd bit | 2nd bit | 1st bit | 0th bit |
|---|---|---|---|---|---|---|---|
| | | | | | No List | Partial List | Complete List |

(d) Connection List Information

[FIG. 29]

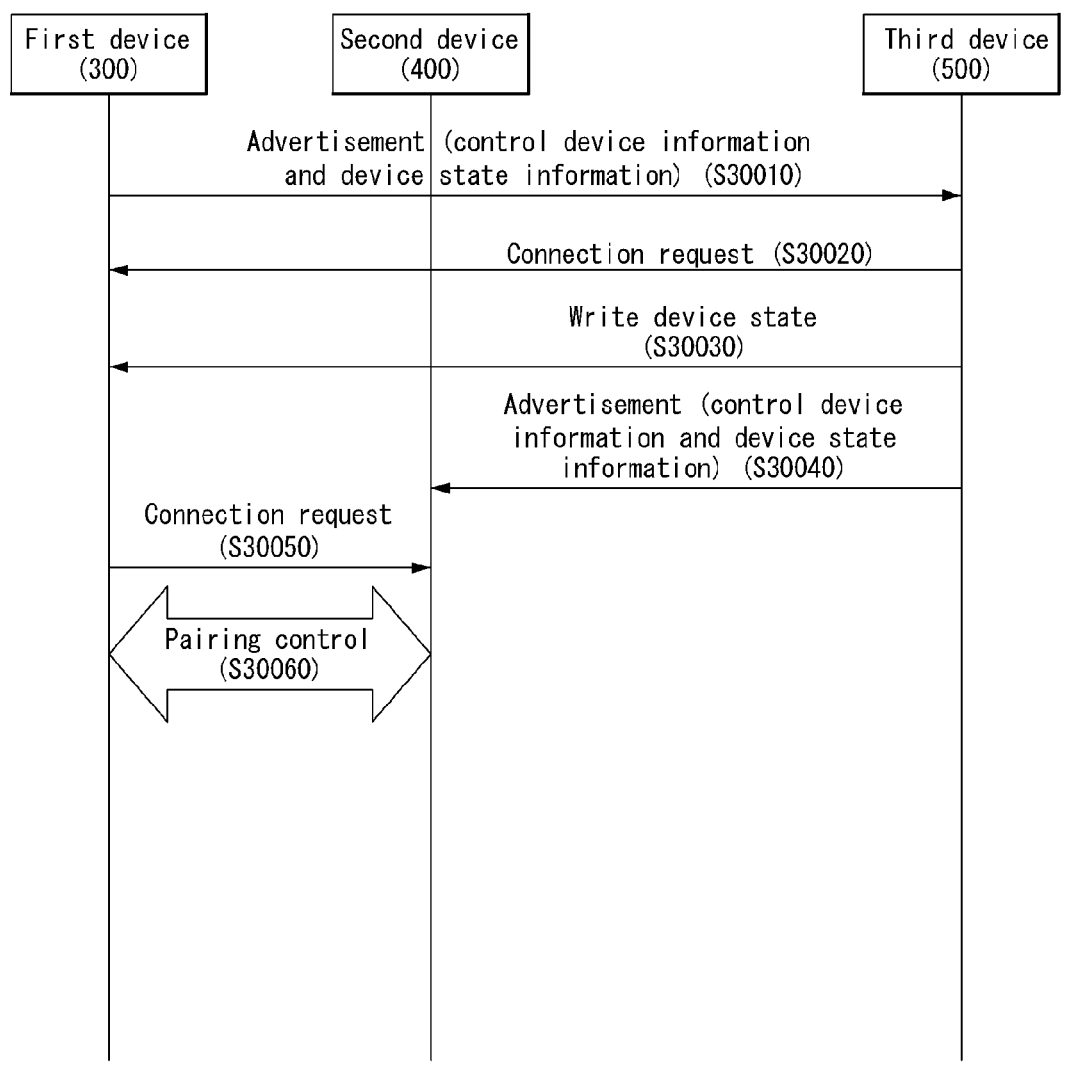
[FIG. 30]

[FIG. 31]
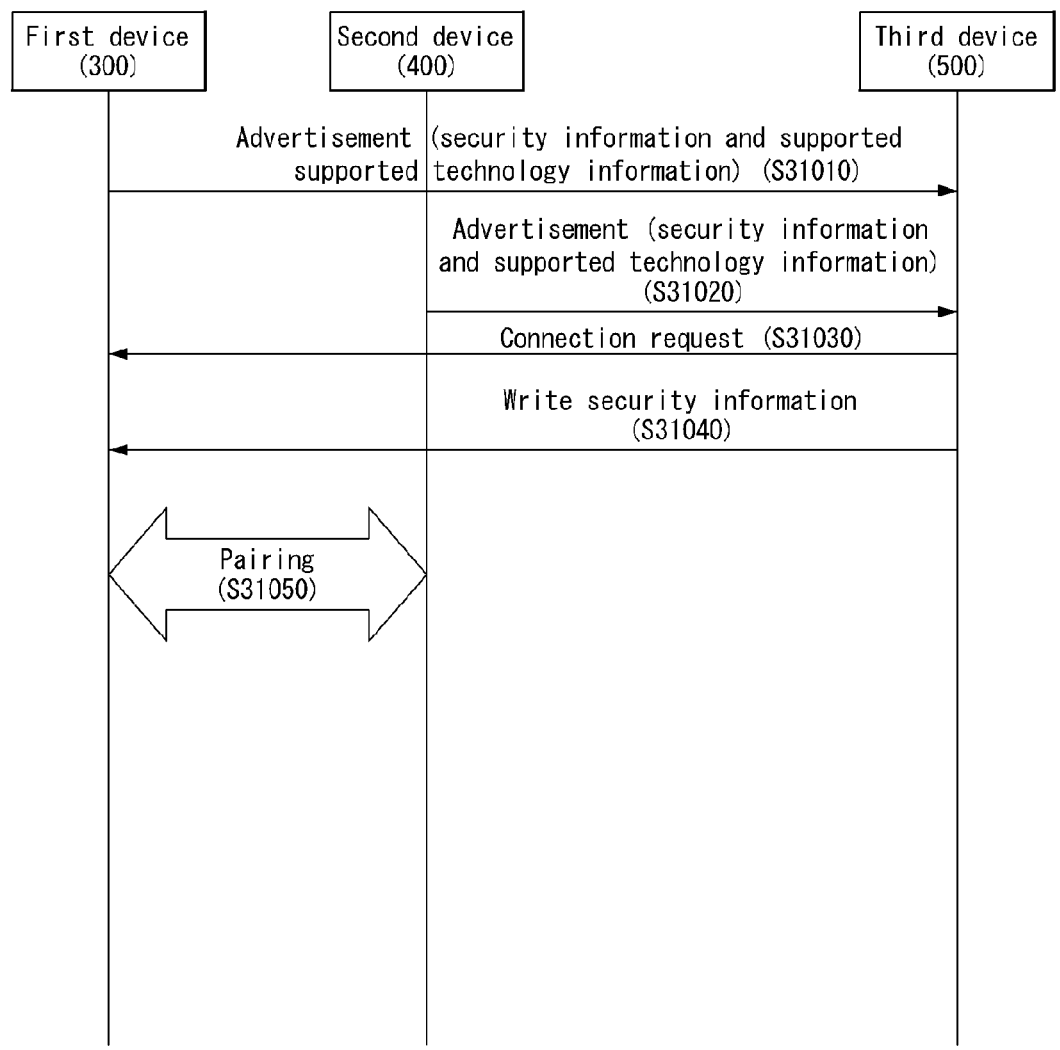

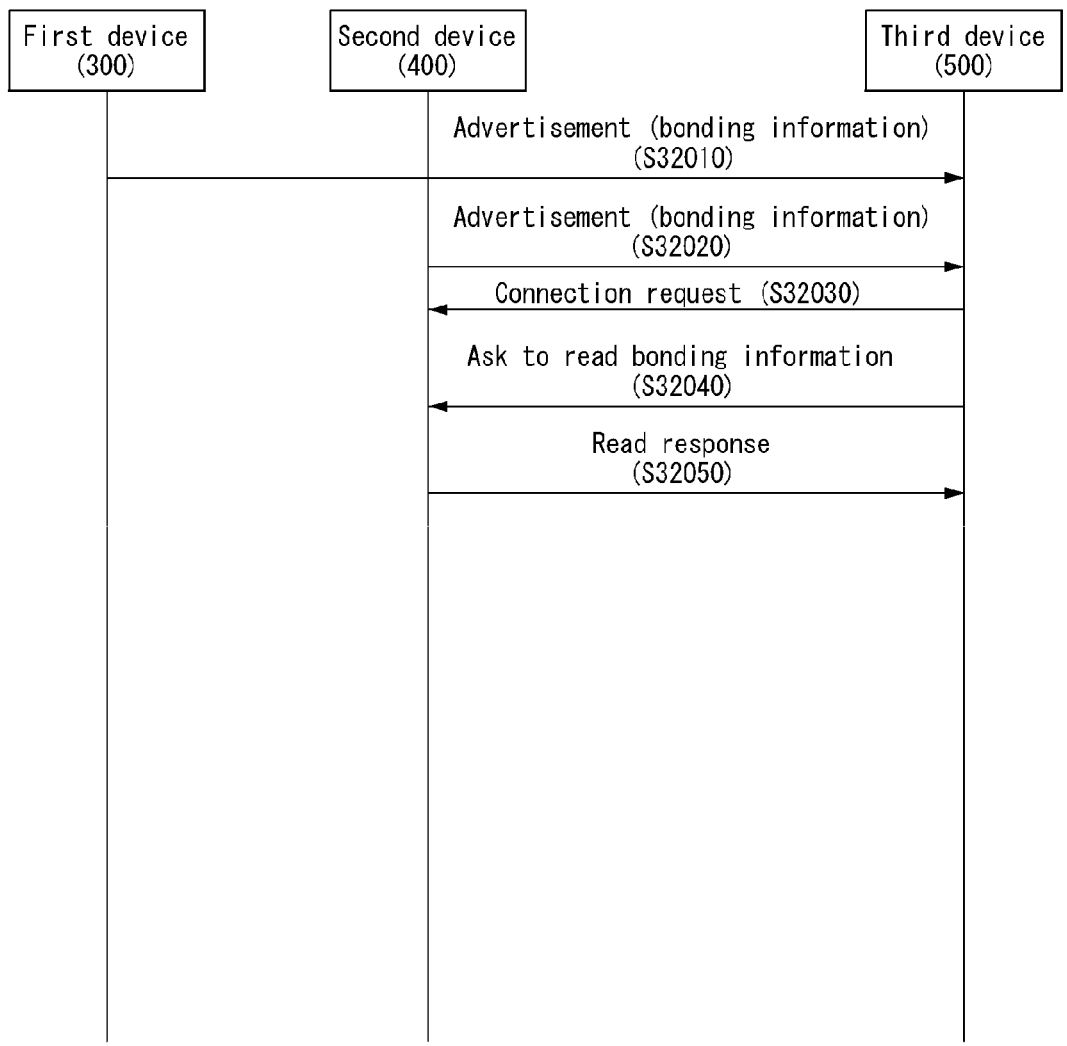

[FIG. 33]
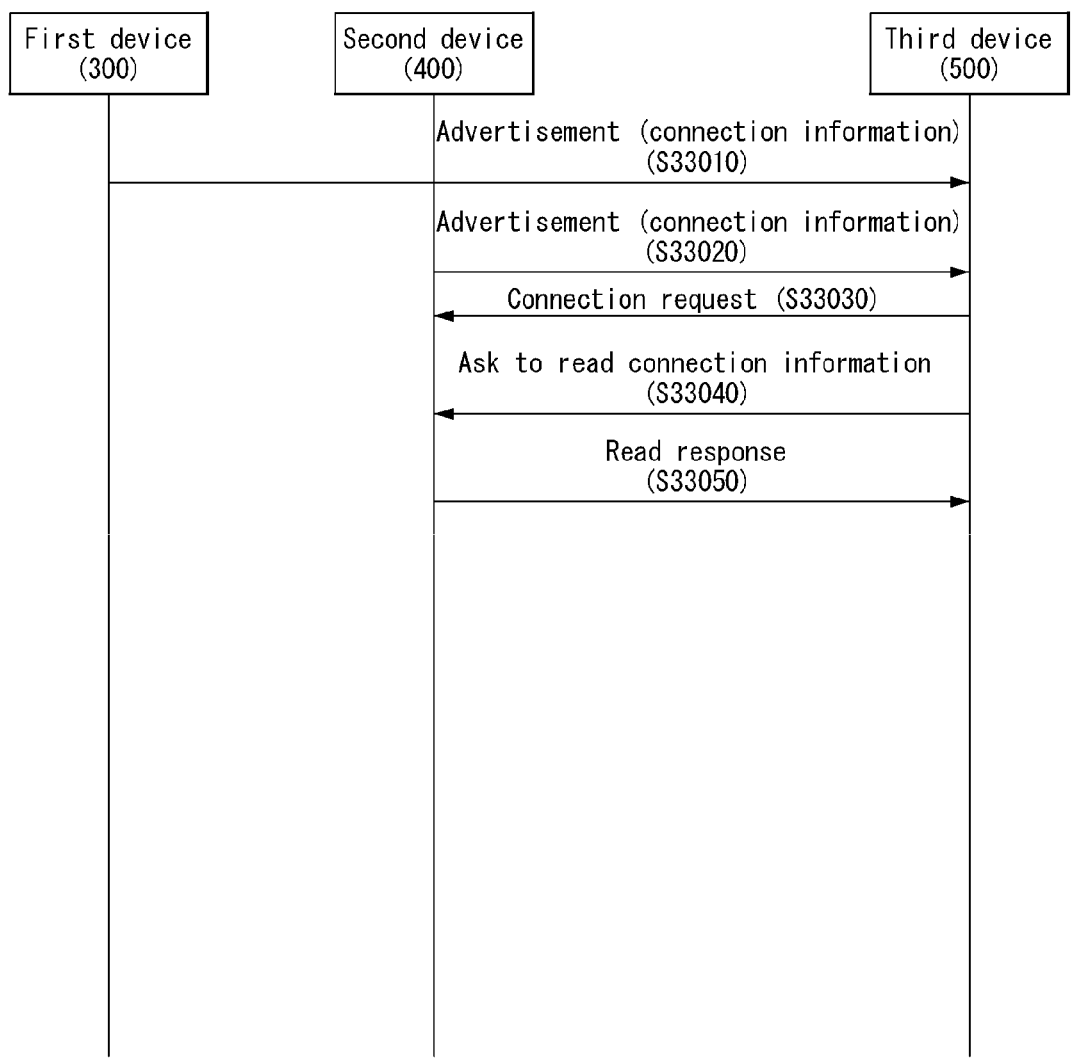

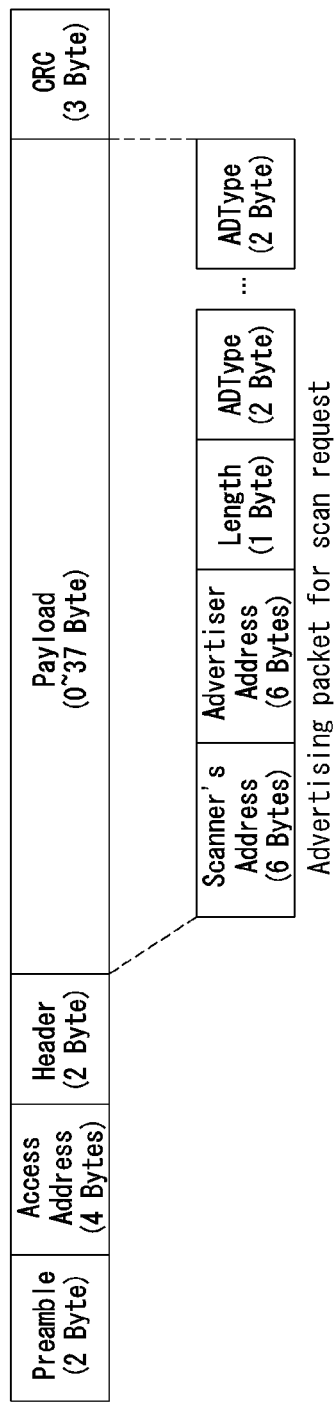
[FIG. 34]

| ADType for SCAN REQ (2Bytes) | M/O | Description |
|---|---|---|
| Pairing Status | M | Ask for Device's Pairing status |
| Device Address value | M | Unique ID value for identifying Device |
| Device Address type | M | Identify which type of wireless interface Address corresponds to |
| Device Address length | M | Length of Device Address value |
| Synch Code | M | Value received and sent to synchronize two devices |
| Scan Window Interval | M | Interval at which device listens to receive signals sent from other devices |
| Link Address | M | ID value for identifying Link when wireless connection is established between two devices |
| Clock | M | Native Clock of device |
| Scan Mode | M | Pattern in which device listens to receive signals sent from other devices |
| Connection Start | M | Command for indicating device-to-device connection using particular wireless interface |
| Number of connections | M | Number of devices connected to particular wireless interface |
| Device Status | M | Device's state such as on/off state of particular wireless interface |
| Carrier Bitmask | M | Value indicating the type of wireless interface device has |
| Listen Channel | M | Channel over which P2Ps exchange data in searching stage |
| Channel Class | M | Frequency band used for Wi-Fi (2.4GHz / 5GHz / 60GHz) |
| SSID | M | Identifier for connection between wireless device and AP |
| P2P Capability | M | Ability to connect to P2P group |
| Configuration Method | M | Connection method dependent on external interfaces (e.g., WSCIE (Wi-Fi)) |
| Supported Rate | M | Tx Rate |
| Peer addr | M | External Interface Address of Peer Device |
| Channel Information | M | Overall channel information such as Supported Channel List or Channel Map |
| Operating Channel | M | Channel over which two devices are connected and exchange data |
| Connection Status | M | Information about whether device is connected to other devices and which device it is connected to |
| Active Period | M | Time during which interface is Active when it alternates between Active state and Sleep state |
| Sleep Period | M | Time during which interface Sleeps when it alternates between Active state and Sleep state |
| Packet Transmission Interval | M | Time between two packets when interface is configured to periodically send packets |

[FIG. 35]

[FIG. 36]

| ADData for ADType = Pairing Status | Data Length | M/O | Description |
|---|---|---|---|
| Pairing Status | 2 Bytes | M | Indicates Device's Pairing status |
| Types of Pairing(Connection) | 1 Bytes | M | Types of Pairing(Connection)<br>1st bit:BR /EDR<br>2nd bit: LE<br>3rd bit: Wi-Fi Direct<br>4th bit:Miracast<br>4th bit:Wi-Gig |
| Advertiser Device GAP Roles | 1 Byte | M | Device Role types defined by GAP<br>1st bit: BR/EDR Master<br>2nd bit: BR/EDR Slave<br>3rd bit: LE Broadcaster<br>4th bit: LEScanner<br>5th bit: LECentral<br>6th bit: LEPeripheral |
| Paired Device ID | 6 Bytes | M | Paired Device BD_ADDR |
| Paired Device GAP Roles | 1 Byte | M | Device Role types defined by GAP<br>1st bit: BR/EDR Master<br>2nd bit: BR/EDR Slave<br>3rd bit: LE Broadcaster<br>4th bit: LEScanner<br>5th bit: LECentral<br>6th bit: LEPeripheral |

[FIG. 37a]

| | | | |
|---|---|---|---|
| Paired Device Manufacturer ID | 1 Byte | M | Manufacturer ID |
| Paired Device Appearance | 2 Bytes | M | GATTexternal appearance of this device. The values are composed of a category (10bits) and sub categories (6 bits) |
| Paired Device Class of Device | 3 Bytes | M | Indicates which device class device corresponds to (ex: Print, Headset? Major Device Class + Minor device class + Service Class field |
| Pairing Security Modes | 1 Byte | M | Information sent and received for security during pairing<br>- Security Modes<br>- BR/EDR 1~4 modes<br>- LE 1~4 modes |
| Paired Device Bonding Info. | 1 Byte | 0 | Bonding Status: Bondable, NoBondable, Bonded Device IDs (Optional) |
| Number of Available Connections | 2 Bytes | 0 | Number of Available Connections |
| Paired Device Shortened Device Friendly Name | 8 Bytes | 0 | Shortened Device Friendly Name (i.e. Surname + 4digit of Phone number = Tom1234 ) |
| Profile IDs | 16Bytes | 0 | 128-bit UUIDs of Profiles supported by device |
| Service IDs | 16Bytes | 0 | 128-bit UUIDs of Services supported by device |

[FIG. 37b]

| ADType for SCAN_RSP (2Bytes) | Data Length | M/O | Description |
|---|---|---|---|
| Pairing Status | 2 Bytes | M | Indicates Device's Pairing status Types of Pairing(Connection) + Master Device ID + Master Device's Role + Slave Device ID + Slave Device's Role + Profile ID + Profile Specific Channels + Number of Available Connections |
| Device Address value | 2 Bytes | M | Unique ID value for identifying Device |
| Device Address type | 2 Bytes | M | Identify which type of wireless interface Address corresponds to |
| Device Address length | 2 Bytes | M | Length of Device Address value |
| Synch Code | 2 Bytes | M | Value received and sent to synchronize two devices |
| Scan Window Interval | 2 Bytes | M | Interval at which device listens to receive signals sent from other devices |
| Link Address | 2 Bytes | M | ID value for identifying Link when wireless connection is established between two devices |
| Clock | 2 Bytes | M | Native Clock of device |
| Scan Mode | 2 Bytes | M | Pattern in which device listens to receive signals sent from other devices |
| Connection Start | 2 Bytes | M | Command for indicating device-to-device connection using particular wireless interface |
| Number of connections | 2 Bytes | M | Number of devices connected to particular wireless interface |

[FIG. 38a]

| | | | |
|---|---|---|---|
| Device Status | 2 Bytes | M | Device's state such as on/off state of particular wireless interface<br>1st bit: Device Power On/OFF<br>2nd bit: BR/EDR Power On/OFF<br>3rd bit: LE Power On/OFF<br>4th bit: Wi Fi On/OFF<br>5th bit: 3G Mobile Network Power On/OFF<br>6th bit: LTE Mobile Network Power On/OFF |
| Carrier Bitmask | 2 Bytes | M | Value indicating the type of wireless interface device has |
| Listen Channel | 2 Bytes | M | Channel over which P2Ps exchange data in searching stage |
| Channel Class | 2 Bytes | M | Frequency band used for Wi-Fi(2.4GHz / 5GHz / 60GHz) |
| SSID | 2 Bytes | M | Identifier for connection between wireless device and AP |
| P2P Capability | 2 Bytes | M | Ability to connect to P2P group |
| Configuration Method | 2 Bytes | M | Connection method dependent on external interfaces (e.g., WSCIE (Wi-Fi)) |
| Supported Rate | 2 Bytes | M | Tx Rate |
| Peer addr | 2 Bytes | M | External Interface Address of Peer Device |

[FIG. 38b]

| Channel Information | 2 Bytes | M | Overall channel information such as Supported Channel List or Channel Map |
|---|---|---|---|
| Operating Channel | 2 Bytes | M | Channel over which two devices are connected and exchange data |
| Connection Status | 2 Bytes | M | Information about whether device is connected to other devices and which device it is connected to |
| Active Period | 2 Bytes | M | Time during which interface is Active when it alternates between Active state and Sleep state |
| Sleep Period | 2 Bytes | M | Time during which interface Sleeps when it alternates between Active state and Sleep state |
| Packet Transmission Interval | 2 Bytes | M | Time between two packets when interface is configured to periodically send packets |

[FIG. 38c]

[FIG. 39]
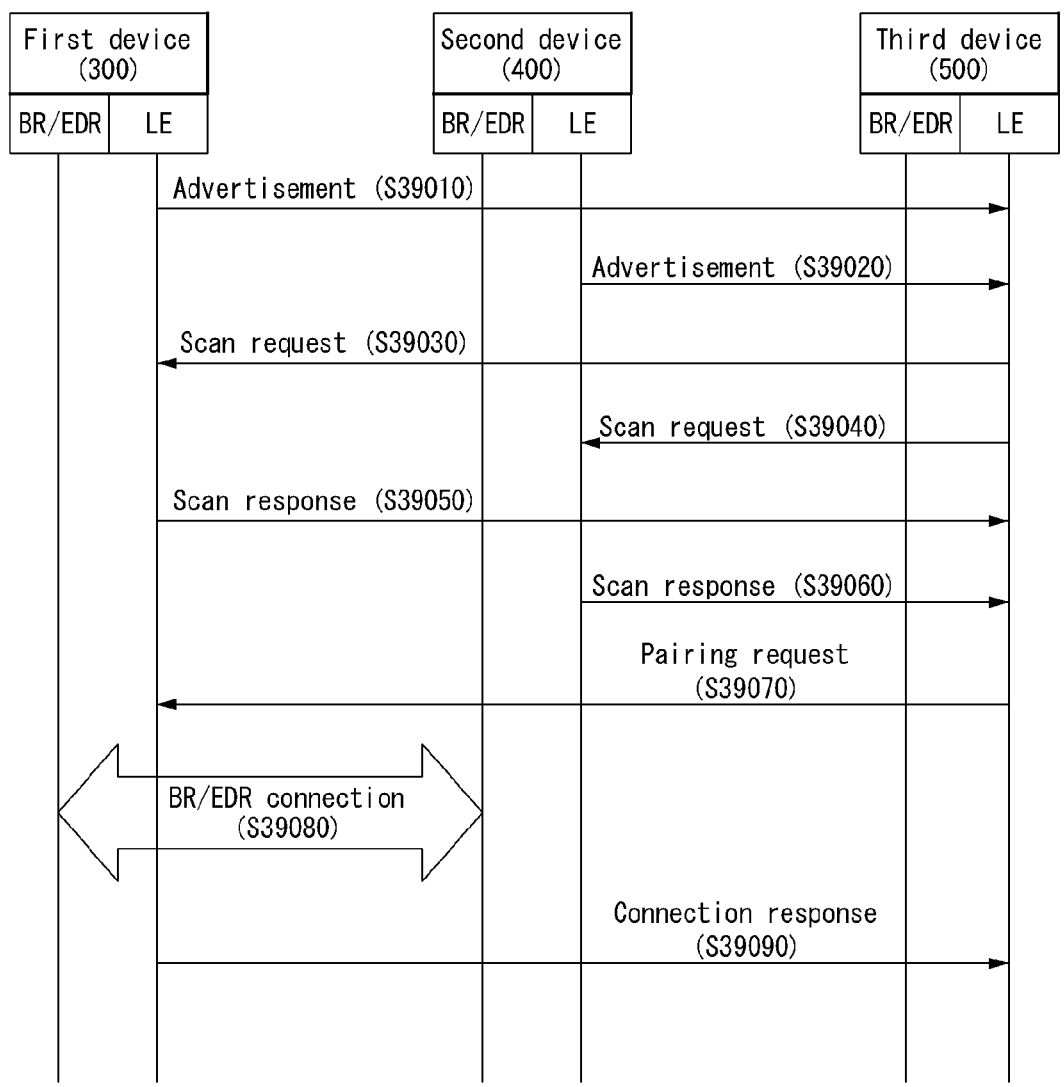

[FIG. 40]
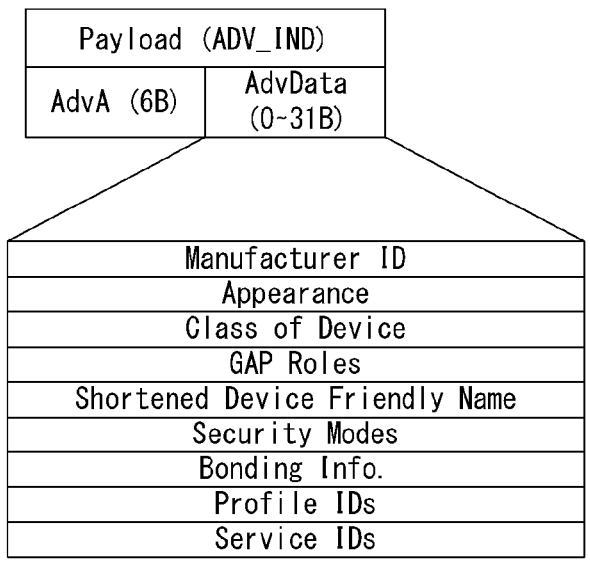
(a) Payload of advertising packet
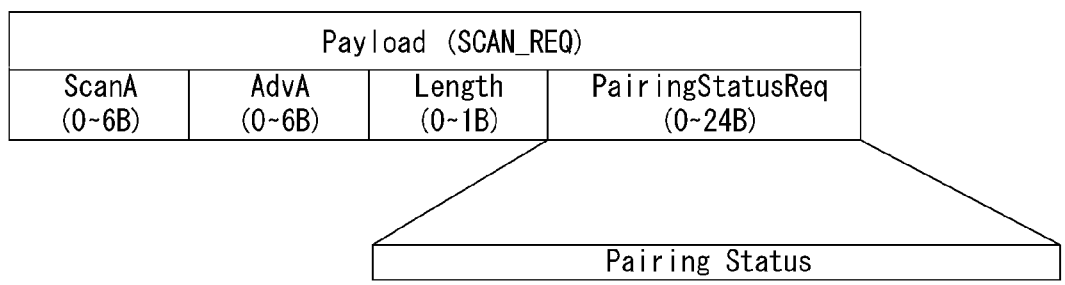
(b) Payload of scan request packet

[FIG. 41]

| Payload (SCAN_RSP) ||
|---|---|
| AdvA (6B) | Pairing StatusData (0~31B) |

(a) Payload of scan response packet

| Data type | Explanation |
|---|---|
| ScanA | Pairing result such as connection complete or connection failure |

(b) Connection response packet

METHOD AND DEVICE FOR CONTROLLING DEVICE BY USING BLUETOOTH LOW ENERGY (LE) TECHNOLOGY

CROSS REFERENCE TO RELATED APPLICATIONS

This application is the National Phase of PCT International Application No. PCT/KR2015/009251, filed on Sep. 2, 2015, which claims priority under 35 U.S.C. 119(e) to U.S. Provisional Application Nos. 62/044,955 filed on Sep. 2, 2014 and 62/046,125 filed on Sep. 4, 2014, all of which are hereby expressly incorporated by reference into the present application.

TECHNICAL FIELD

The present invention relates to a method and device for forming a device-to-device connection in a wireless communication system by using Bluetooth, a short-range technology, and more particularly, to a method and device for forming a device-to-device connection by using Bluetooth Low Energy (BLE) technology.

BACKGROUND ART

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

One aspect of the present invention is to provide a method for controlling a device by using Bluetooth LE (Low Energy) technology.

Another aspect of the present invention is to provide a method for controlling a device's connection by using Bluetooth LE (Low Energy) technology.

Yet another aspect of the present invention is to provide a method for acquiring a device's state information by using Bluetooth LE (Low Energy) technology.

A further aspect of the present invention is to provide a method for acquiring a device's bonding information by using Bluetooth LE (Low Energy) technology.

A further aspect of the present invention is to provide a method for acquiring a device's connection information by using Bluetooth LE (Low Energy) technology.

A further aspect of the present invention is to provide a method for controlling a device's connection via other wireless network interfaces than Bluetooth LE Low Energy) by using Bluetooth LE (Low Energy) technology.

A further aspect of the present invention is to define a GATT (Generic Attribute Profile) structure for controlling a device-to-device connection by using Bluetooth LE (Low Energy) technology.

A further aspect of the present invention is to define a message format for controlling a device-to-device connection by using Bluetooth LE (Low Energy) technology.

Technical problems to be solved by the present invention are not limited to the above-mentioned technical problems, and other technical problems not mentioned above can be clearly understood by one skilled in the art from the following description.

Technical Solution

The present invention has been made in an effort to provide a method for controlling a connection between a first device and a second device by using Bluetooth LE (Low Energy) technology.

An exemplary embodiment of the present invention provides a method for controlling a connection between a first device and a second device by using Bluetooth LE (Low Energy) technology, the method comprising: receiving from the first device an advertising message including information related to a connection control service; connecting with the first device based on the advertising message; and requesting the first device to write in the characteristics of the first device in order to instruct to perform a specific operation, wherein the advertising message includes at least of one role information indicating a role of the first device, bonding information indicating a bonding state, or connection information indicating a connection state.

Furthermore, the bonding information may include at least one of mode information indicating whether the first device is bondable, list information indicating a list of bonded devices, number information indicating a number of bonded devices, or address information indicating the addresses of bonded devices.

Furthermore, the list information may include one of partial list information indicating part of the bonded device list or complete list information indicating complete of the bonded device list.

Furthermore, the method may further comprise: transmitting a read request message for requesting remaining list information of the bonded device list based on the connection when the list information includes the partial list information; and receiving a read response message including the remaining list information in response to the read request message.

Furthermore, the connection information may include at least one of mode information indicating whether the first device is connectable, list information indicating a list of connected devices, number information indicating the number of connected devices, or address information indicating the addresses of connected devices.

Furthermore, the connection list information may include one of partial list information indicating part of the connected device list or complete list information indicating complete of the connected device list.

Furthermore, the method may further comprise: transmitting a read request message for requesting remaining list information of the connected device list based on the connection when the list information comprises the partial list information; and receiving a read response message including the remaining list information in response to the read request message.

Furthermore, the advertising message may include at least one of device information indicating a device that controls the first device's connection, state information indicating the first device's state, supported technology information indicating the wireless communication technology supported by the first device, or security information indicating the security level of the first device.

Furthermore, the specific operation may be one of connecting with the second device, changing the state of the first device, or changing the security mode of the first device.

Furthermore, the method may further comprise: requesting the first device to write wireless communication technology information for connection with the second device when the specific operation is connecting with the second device; requesting the first device to write the second device's address information; and requesting the first device to write service information the first device wants to provide through a connection with the second device.

Furthermore, the method may further comprise receiving from the first device connection state information indicating the connection state between the first device and the second device.

Another exemplary embodiment of the present invention provides a device for controlling a connection between a first device and a second device by using Bluetooth LE (Low Energy) technology, the device comprising: a communication unit for communicating with external devices in a wireless or wired manner; and a processor functionally connected to the communication unit, wherein the processor receives from the first device an advertising message including information related to a connection control service, connects with the first device based on the advertising message, and requests the first device to write in the characteristics of the first device in order to instruct to perform a specific operation, wherein the advertising message includes at least one of role information indicating a role of the first device, bonding information indicating a bonding state, or connection information indicating a connection state.

Furthermore, the bonding information may include at least one of mode information indicating whether the first device is bondable, list information indicating a list of bonded devices, number information indicating a number of bonded devices, or address information indicating the addresses of bonded devices.

Furthermore, the list information may include one of partial list information indicating part of the bonded device list or complete list information indicating complete of the bonded device list.

Furthermore, when the list information includes one of the partial list information, the processor transmits a read request message for requesting remaining list information of the bonded device list based on the connection, and receives a read response message including the remaining list information in response to the read request message.

Furthermore, the connection information may include at least one of mode information indicating whether the first device is connectable, list information indicating a list of connected devices, number information indicating the number of connected devices, or address information indicating the addresses of connected devices.

Furthermore, the connection list information may include one of partial list information indicating part of the connected device list or complete list information indicating the complete of connected device list.

Furthermore, when the list information includes the partial list information, the processor transmits a read request message for requesting remaining list information of the connected device list based on the connection, and receives a read response message including the remaining list information in response to the read request message.

Furthermore, the advertising message may include at least one of device information indicating a device that controls the first device's connection, state information indicating the first device's state, supported technology information indicating the wireless communication technology supported by the first device, or security information indicating the security level of the first device.

Furthermore, the specific operation may be one of connecting with the second device, changing the state of the first device, or changing the security mode of the first device.

Advantageous Effects

According to a method for controlling a device by using Bluetooth LE (Low Energy) technology according to an exemplary embodiment of the present invention, a connection between other devices may be controlled by means of a control device.

Furthermore, according to the present invention, a connection between other devices may be controlled by acquiring information on network interfaces supported by these other devices by means of a control device by using Bluetooth LE (Low Energy) technology.

Furthermore, according to the present invention, a connection between other devices may be made efficiently since a connection between other devices is controlled by acquiring information on network interfaces supported by these other devices by means of a control device by using Bluetooth LE (Low Energy) technology.

Furthermore, according to the present invention, a connection between other devices with no UI (User Interface) may be made efficiently by controlling a connection between other devices by means of a control device by using Bluetooth LE (Low Energy) technology.

Furthermore, according to the present invention, a control device may acquire other devices' bonding information by using Bluetooth LE (Low Energy) technology.

Furthermore, according to the present invention, a control device may acquire other devices' connection information by using Bluetooth LE (Low Energy) technology.

Furthermore, according to the present invention, a Bluetooth LE connection may be made, offering low power consumption and stable connectivity by using Bluetooth LE (Low Energy) technology.

Advantages which may be obtained in this specification are not limited to the aforementioned advantages, and various other advantages may be evidently understood by those skilled in the art to which the present invention pertains from the following description.

BRIEF DESCRIPTION OF THE DRAWINGS

FIG. 1 is a schematic view illustrating an example of a wireless communication system using a Bluetooth low energy technology to which the present invention is applicable.

FIG. 2 is an internal block diagram of an example of devices to which the present invention is applicable.

FIG. 3 is a view illustrating an example of a Bluetooth low energy topology.

FIG. 4 is a view illustrating an example of a Bluetooth communication architecture to which the present invention is applicable.

FIG. 5 is a view illustrating an example of a structure of a generic attribute profile (GATT) of Bluetooth low energy.

FIG. 6 is a flowchart illustrating a method for forming a device-to-device connection by using Bluetooth LE (Low Energy).

FIG. 7 is a view schematically illustrating a method for controlling the formation of a connection between other devices by means of a control device according to an exemplary embodiment of the present invention.

FIG. 8 is a view illustrating an example of the characteristics of a GATT (Generic Attribute Profile) for controlling a device by using Bluetooth LE (Low Energy) technology according to an exemplary embodiment of the present invention.

FIGS. 9 to 14 are views each illustrating an example of each characteristic according to an exemplary embodiment of the present invention.

FIG. 15 illustrates an example of a method for controlling a connection between other devices by means of a control device according to an exemplary embodiment of the present invention.

FIG. 16 illustrates another example of a method for controlling a connection between other devices by means of a control device according to an exemplary embodiment of the present invention.

FIG. 17 illustrates yet another example of a method for controlling a connection between other devices by means of a control device according to an exemplary embodiment of the present invention.

FIG. 18 illustrates a further example of a method for controlling a connection between other devices by means of a control device according to an exemplary embodiment of the present invention.

FIG. 19 illustrates a further example of a method for controlling a connection between other devices by means of a control device according to an exemplary embodiment of the present invention.

FIG. 20 illustrates a further example of a method for controlling a connection between other devices by means of a control device according to an exemplary embodiment of the present invention.

FIG. 21 illustrates a further example of a method for controlling a connection between other devices by means of a control device according to an exemplary embodiment of the present invention.

FIG. 22 illustrates a further example of a method for controlling a connection between other devices by means of a control device according to an exemplary embodiment of the present invention.

FIG. 23 illustrates a further example of a method for controlling a connection between other devices by means of a control device according to an exemplary embodiment of the present invention.

FIGS. 24 to 29 illustrate examples of information that may be included in an advertising message for controlling a connection between other devices by means of a control device according to an exemplary embodiment of the present invention.

FIG. 30 illustrates an example of a method for controlling a connection by acquiring other devices' state information through an advertising message according to an exemplary embodiment of the present invention.

FIG. 31 illustrates another example of a method for controlling a connection by acquiring other devices' state information through an advertising message according to an exemplary embodiment of the present invention.

FIG. 32 illustrates an example of a method for acquiring other devices' state information through an advertising message according to an exemplary embodiment of the present invention.

FIG. 33 illustrates another example of a method for acquiring other devices' state information through an advertising message according to an exemplary embodiment of the present invention.

FIGS. 34 and 35 illustrate an example of the data format of and information in an advertising message according to an exemplary embodiment of the present invention.

FIGS. 36 to 38 illustrate an example of the data format of and information in an advertising message for providing a device's state information according to an exemplary embodiment of the present invention.

FIGS. 39 to 41 illustrate an example of a method and data format for acquiring other devices' information by means of a control device according to an exemplary embodiment of the present invention.

BEST MODE

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Also, a plurality of devices measuring exercising activities of human beings through a fitness equipment using a specific device have been presented, but a device transmitting measured exercising data through Bluetooth to show specific numerical values to users has not been introduced yet.

Thus, the present invention proposes a method for measuring human beings' exercising activities through the fitness equipment and transmitting and processing measured data through Bluetooth LE to provide the processed data to users.

FIG. 2 is an internal block diagram of an example of devices to which the present invention is applicable.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As discussed above, in the BLE technology, a duty cycle is small and power consumption may be significantly reduced through a low data rate.

The user input interfaces 112 and 122 refer to modules providing a user input such as a screen button to the controllers to enable the user to control an operation of the devices.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

Device D is an advertiser and device A is an initiator (group D).

Device E is a scanner and Device C is an advertiser (group C).

Device H is an advertiser, and devices I and J are scanners (group H).

Device K is also an advertiser, and device N is an initiator (group K).

Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

FIG. 4 is a view illustrating an example of a Bluetooth communication architecture to which the present invention is applicable.

Referring to FIG. 4, (a) of FIG. 4 illustrates an example of a protocol stack of a Bluetooth basic rate (BR/enhanced data rate (EDR) that supports GATT (Generic Attribute Profile), and (b) of FIG. 4 illustrates an example of a protocol stack of Bluetooth low energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43), a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data
② Include: It defines a relationship between services
③ Characteristics: It is a data value used in a server
④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

Battery: Battery information exchanging method
Time: Time information exchanging method
FindMe: Provision of alarm service according to distance
Proximity: Battery information exchanging method
Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit scan responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state, It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_ND |
| 0001 | ADV_DIRECT_IND |
| 0010 | ADV_NONCONN_ND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 is a view illustrating an example of a structure of a generic attribute profile (GATT) of Bluetooth low energy.

Referring to FIG. 5, a structure for exchanging profile data of Bluetooth low energy may be looked through.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present invention proposes a method in which a sensor measures and stores human activities by using a GATT-based operational structure of the Bluetooth LE, and a client retrieves the stored information from the sensor.

FIG. 6 is a flowchart illustrating a method for forming a device-to-device connection by using Bluetooth LE (Low Energy).

As illustrated in FIG. 6, for a Bluetooth LE connection between a first device 300 and a second device 400, the first device 300 sends an advertising message to the second device (S6010).

As described above, the advertising message is used for a device to provide its own information to other devices by using Bluetooth LE, and may include various information including service information, user information, etc. provided by the device.

The second device 400 acknowledges the information included in the advertising message sent by the first device 300, and then sends a connection request message to the first device 300 requesting for a Bluetooth LE connection (S6020). Then, the first device 300 and the second device 400 form a Bluetooth LE (Low Energy) connection (S6030).

With this method, however, it is not possible to control the formation of connections, to check PIN numbers, and to control connection settings unless the first device 300 and/or the second device 400 has a UI (user interface).

Hence, in order to solve this problem, the present invention proposes a method for forming a connection between the first device 300 and the second device 400 by using a third device.

FIG. 7 is a view schematically illustrating a method for controlling the formation of a connection between other devices by means of a control device according to an exemplary embodiment of the present invention.

As illustrated in FIG. 7, a third device 500 is required in order to form a connection between a first device 300 and a second device 400, and a new control protocol is required in order for the third device 500 to control the first device 300 and the second device 400.

A control device which represents a device controlling the formation of a connection between the first device 300 and the second device 400 will be hereinafter referred to as the third device 500.

The third device 500 controls a connection between other devices (e.g., Bluetooth devices) without using an actual service or profile.

In order to control a connection state between other devices, the third device 500 needs to know these other devices' information (e.g., interface information, service information, etc.).

FIG. 8 is a view illustrating an example of the characteristics of a GATT (Generic Attribute Profile) for controlling a device by using Bluetooth LE (Low Energy) technology according to an exemplary embodiment of the present invention.

Descriptions of the characteristic included in a GATT Database which are listed in FIG. 8 are as follows:

Peer Device: The address and name of the other device to pair with. The address of a device to pair with is provided by setting this value.

Agent Device: It provides information on a control device capable of controlling pairing or connections.

Group Info: The name or address of a group to which the device concerned belongs. The names or addresses of a number of groups may be used. It enables to distinguish whether the device concerned is a group owner or a member.

Device State: It indicates Scanning, Standby, Advertising, Initiating, or Connection State which corresponds to a Link Layer State of a controlled device. A single state or multiple states may be designated as Device State. The device may be requested to perform the function of the state concerned through Write, the current state of the controlled device may be found out through Read, and a change in the state of the controlled device may be found out through Indication.

Pairing/connection control point: A control point function for indicating which action a controlled device shall execute.

Connection State: A characteristic by which a controlled device provides connection information to a control device.

WhiteList: It includes information on devices a controlled device can connect to, and, if required, can be extended to make connections with multiple devices.

WhiteList Control Point: It indicates a control function for managing a WhiteList managed by a controlled device.

Bondable: It indicates whether a controlled device provides a bonding function or not.

Security: It indicates whether authentication, authorization, encryption, and data signing functions are provided or not.

Connected Tech Type & Service Type: A communication technology by which a device wants to connect (e.g., WiFi, Ethernet, BR/EDR, BLE, etc.) and the type of a connected service.

Scheduled Time: A time value used to request for a connection at a specific time.

FIG. 9 illustrates an example of the Peer Device and Agent Device included in the characteristics listed in FIG. 8. (a) of FIG. 8 illustrates an example of the Peer Device, and (b) of FIG. 8 illustrates an example of the Agent Device.

FIG. 10 illustrates an example of the Device State included in the characteristics listed in FIG. 8. As shown in (a) of FIG. 10, the types of the Device State may be divided into Current Device States, which indicates the current state of a device, and Operated Device States, which indicates operable states of the device, which may be distinguished by the Mode of (b) of FIG. 10. For example, if the Mode has a value of '0', it indicates Current Device State, and if the Mode has a value of '1', it indicates Operated Device States.

In this case, if the Mode indicates Current Device State, information on only one state indicating the current state of the device may be provided, and if the Mode indicates Operated Device States, information on a number of states in which the device is currently operable may be provided.

For example, if the Mode indicates Current Device State, only one of the bits indicating the device states listed in (b) of FIG. 10 may be used (the value of a specific bit indicating a state may be '1'), and if the Mode indicates Operated Device States, a number of bits may be used (the value of multiple bits may be '1').

FIG. 11 illustrates an example of the Pairing/connection control point included in the characteristics listed in FIG. 8. A control device may control a device by instructing the device to perform a specific operation through the Pairing/connection control point.

The operations of the Pairing/connection control point shown in FIG. 11 may be defined as follows:

Execute: The device provides the states defined in Device States (The device may provide a plurality of states).

Advertising Start: Starts the corresponding operation if the device is not advertising (Starts the corresponding function immediately and/or enables the corresponding function if the corresponding state in Device States is disabled).

Advertising Stop: Stops the corresponding operation if the device is advertising (Stops the corresponding function immediately and/or disables the corresponding function if the corresponding state in Device States is abled).

Scanning Start: Starts the corresponding operation if the device is not scanning (Starts the corresponding function immediately and/or enables the corresponding function if the corresponding state in Device States is disabled).

Scanning Stop: Stops the corresponding operation if the device is advertising.

(Stops the corresponding function immediately and/or disables the corresponding function if the corresponding state in Device States is abled).

Connecting Request: Sets up a connection with Peer Device

Connection Stop: Terminates a connection with Peer Device

Refresh Bonding: Refreshes Bonding information (or deletes Bonding information)

Refresh Security: Re-performs a security procedure (authentication, authorization, and encryption between two devices) and refreshes information (key values for each stage of the security procedure)

Pairing Request: Executes a Pairing procedure with Peer Device

Pairing Stop: Stops pairing with Peer Device

Authentication: Performs authentication with Peer Device

Encryption: Performs encryption with Peer Device

Authorization: Performs authorization with Peer Device

FIG. 12 illustrates an example of the Connection Status included in the characteristics listed in FIG. 8, which may provide a controlled device's state information. In this case, the state information may be provided as follows:

Only indicates whether there is a connection or not

Indicates whether there is a connection or not and provides a connected device's information (address or friendly name)

Indicates various states (initiating, advertising, and scanning) including connection Provides a peer device's information when the device is initiating Provides detailed information (advertising/scanning method and operation mode) when the device is advertising or scanning)

If required, connection-related information such as Connected Tech Type, Service Type, Security, and Group Info may be provided as well Through the Connection State, the control device may be aware of the state of a controlled device.

FIG. 13 illustrates two examples of the Connection Tech Type included in the characteristics listed in FIG. 8. In these examples, the control device is able to control the communication technology by which the controlled device is connected and to know by which communication technology the controlled device is connected.

The communication technologies listed in FIG. 13 are merely examples, and other various communication technologies may be included.

FIG. 14 illustrates an example of the Security included in the characteristics listed in FIG. 8. In this example, the Security Mode and/or Security Level provided by a device may be controlled.

(a) of FIG. 14 illustrates the Security Mode of the device, (b) of FIG. 14 indicates the Security Level of the device, and (c) of FIG. 14 indicates the Security Mode and Security Level of the device.

In the Security Mode and Security Level, it is possible to decide whether to provide the authentication, authorization, encryption, and data signing functions or not. In a process of controlling a connection between two devices, if their Security Modes and/or Security Levels do not match, the control device may match the Security Modes and/or Security Levels of the two devices through a Write message.

The characteristics of Bluetooth GATT described in FIGS. 8 to 14 may be used in an exemplary embodiment of the present invention to be described hereinbelow.

FIG. 15 illustrates an example of a method for controlling a connection between other devices by means of a control device according to an exemplary embodiment of the present invention.

Referring to FIG. 15, the third device, which is a control device, may control a connection through the Peer Device and Pairing Control Point included in the characteristics stored in the GATT database.

Specifically, the first device 300 sends an advertising message to the third device 500 (S15010). The advertising message may be represented as an advertising PDU (pack data unit), an advertising packet, an advertisement, an advertising frame, an advertising physical channel PDU, etc.

The advertising message may include information on services provided by the first device 300, information relating to the first device, and information on the role of the first device.

For example, as illustrated in FIG. 15, the first device 300 may send to the third device 300 the advertising message, including information indicating that the first device 300 provides pairing control service and object transfer service and information indicating that the first device 300 itself plays the role of a server.

Here, the pairing control service refers to a service that is supported by BLE in order to control a connection between other devices through a control device in Bluetooth communication.

Also, the advertising message may be sent to the third device 500 in a broadcast or unicast manner.

The second device 400 may send an advertising message to the third device 500 like the first device 300 does (S15020). Like the advertising message sent by the first device 300, the advertising message may include information on services provided by the second device 400, information relating to the second device 400, and information on the role of the second device 400.

Afterwards, the third device 500 sends a connection request message in order to form a Bluetooth LE connection with the second device 400 based on the advertising messages sent from the first device 300 and the second device 400 (S15030).

Afterwards, having formed a connection with the second device 400 via BLE, the third device 500 requests the second device 400 to write the address of the first device 300 in the Peer Device included in the characteristics listed in FIG. 8, in order for the second device 400 to connect with the first device (S15040).

The third device 500 may provide the first device 300's information as well when requesting the second device 400 to write.

Having requested the second device 400 to write the address of the first device 300, the third device 500 may instruct the second device 400 to connect with the first device 300 by requesting the second device 400 to write in the '0x06' of the Pairing/connection control point shown in FIG. 8 (S15050).

After receiving an instruction from the third device 500 to connect with the first device 300, the second device 400 receives an advertising message from the first device 300 (S15060), and then sends a connection request message to the first device (S15070).

Afterwards, the first device 300 and the second device 400 may form a connection (S15080), and the second device 400 may send the connection state information of FIG. 8 to the third device 500 through an indication message (S15090).

In this case, in order for the third device 500 to receive the indication message, the third device 500 has to manage information on bonding with the second device 400 and maintain the connection with the second device 400.

In this way, the third device 500 may control the connection by receiving information for connection control from the first device 300 and the second device 400.

FIG. 16 illustrates another example of a method for controlling a connection between other devices by means of a control device according to an exemplary embodiment of the present invention.

Referring to FIG. 16, the third device, which is a control device, may control a connection between the first device and the second device by adding the second device's information to a Whitelist, which is a list of devices the first device can connect to, through a connection with the first device.

Specifically, the first device 300 sends an advertising message to the third device 500 (S16010). The advertising message may be represented as an advertising PDU (pack data unit), an advertising packet, an advertisement, an advertising frame, an advertising physical channel PDU, etc.

The advertising message may include information on services provided by the first device 300, information relating to the first device, and information on the role of the first device.

For example, as illustrated in FIG. 15, the first device 300 may send to the third device 500 the advertising message, including information indicating that the first device 300 provides pairing control service and object transfer service and information indicating that the first device 300 itself plays the role of a server.

Here, the pairing control service refers to a service that is supported by BLE in order to control a connection between other devices through a control device in Bluetooth communication.

Also, the advertising message may be sent to the third device 500 in a broadcast or unicast manner.

Afterwards, the third device 500 sends a connection request message in order to form a Bluetooth LE connection with the first device 300 based on the advertising message sent from the first device 300 (S16020).

Having connected with the first device 300 via Bluetooth LE, the third device 500 requests the first device 300 to read the WhiteList, in order to acquire WhiteList information, which is a list and/or information of devices the first device can connect to (S16030).

The first device 300 sends the WhiteList information to the third device 500 as a response to the request from the third device 500 (S16040).

The WhiteList information may be sent through a read response message or an L2CAP channel.

The third device 500, having received the WhiteList information from the first device 300, does not request the first device 300 to register the second device 400 if the WhiteList information includes the second device 400's information.

On the other hand, if the second device 400's information is not included in the WhiteList information, the third device 500 requests the second device 400 to write in the WhiteList Control Point shown in FIG. 8, in order to add the second device 400 to the WhiteList of the first device 300 (S16050).

In this case, the third device 500 may send the second device 400's information as well in order to add the second device 400's information to the WhiteList.

The first device 300 may add the second device 400's information to the WhiteList and send the changed WhiteList information to connected devices and/or bonded devices through an indication message (S16060).

Afterwards, upon receiving an advertising message from the second device 400 (S16070), the first device 300 may connect with the second device 400 by sending a connection request message to the second device 400 (S16080).

In this way, the third device 500 may control devices the first device 300 can connect to by adding or deleting device information to or from the WhiteList of the first device 300.

In another exemplary embodiment of the present invention, the third device may control a list of devices the first device does not connect to by adding or deleting device information to or from a BlackList, which is the opposite of the WhiteList.

FIG. 17 illustrates yet another example of a method for controlling a connection between other devices by means of a control device according to an exemplary embodiment of the present invention.

Referring to FIG. 17, the third device, which is a control device, may control the first device to perform a security procedure and a bonding procedure with the second device by activating the first device's bonding function or security function.

Firstly, the step S17010 and the step S17020 are identical to the steps S16010 and S16020 of FIG. 16, so descriptions thereof will be omitted.

The third device 500 may activate the first device 300's bonding function by making a write request to write in the Bondable in the characteristics listed in FIG. 8 (S17030).

Once the bonding function is activated, the bonding information of connected devices is maintained. Thus, when making a re-access attempt, re-access may be done fast without a pairing procedure.

Also, when the third device 500 wants to activate the first device 300's security function, the first device 300's security function may be activated by making a write request to write in the Security of FIG. 8 (S17040).

In this case, the Security Mode may be set, and the first device 300 may execute a security functions (e.g., authentication, authorization, encryption, privacy, etc.) according to the Security Mode setting.

Afterwards, the first device 300 sends an advertising message to the second device 400 (S17050), and the second device 400, having received the advertising message, may send a connection request message to the first device 300 and connect with the first device 300 (S17060).

The bonding function and security function of the first device 300 connecting with the second device 400 become active by means of the third device 500. Thus, the first device 300 performs a security procedure with the second device 400 according to the Security Mode setting (S17070), and performs a bonding procedure with the second device 400 according to a set Bondable value (S17080).

FIG. 18 illustrates a further example of a method for controlling a connection between other devices by means of a control device according to an exemplary embodiment of the present invention.

Referring to FIG. 18, the third device, which is a control device, may control the first device to connect with the second device via a particular wireless communication technology.

Specifically, the first device 300 sends an advertising message to the third device 500 (S18010). The advertising message may be represented as an advertising PDU (pack data unit), an advertising packet, an advertisement, an advertising frame, an advertising physical channel PDU, etc.

The advertising message may include information on services provided by the first device 300, information relating to the first device, information on the role of the first device, and information on the wireless communication technology type supported by the first device.

For example, as illustrated in FIG. 15, the first device 300 may send to the third device 500 the advertising message, including information indicating that the first device 300 provides pairing control service and object transfer service, information indicating that the first device 300 itself plays the role of a server, and/or information indicating that the wireless communication technology type supported by the first device 300 itself is Bluetooth LE, Wi-Fi, or NFC.

Here, the pairing control service refers to a service that is supported by BLE in order to control a connection between other devices through a control device in Bluetooth communication.

Also, the advertising message may be sent to the third device 500 in a broadcast or unicast manner.

Afterwards, the third device 500 sends a connection request message in order to form a Bluetooth LE connection with the first device 300 based on the advertising message sent from the first device 300 (S18020).

Having connected with the first device 300, the third device 500 may request the first device 300 to write in the Tech Type included in the characteristics listed in FIG. 8, in order to set the communication technology type by which the first device 300 will form a connection with the second device 400 (S18030).

For example, when the third device 500 wants to control the first device 300 to connect with the second device 400 via Bluetooth LE, the third device 500 may request the first device 300 to set the Tech Type to Bluetooth LE.

Afterwards, the second device 400 may send an advertising message to the third device 500 like the first device 300 does (S18040), and the third device 500 may send a connection request message to the second device 400 to form a connection with the second device 400 (S18050).

Like the advertising message sent by the first device 300, the advertising message sent by the second device 400 may include information on services provided by the second device, information relating to the first device, information on the role of the first device, and information on the wireless communication technology type supported by the first device.

The third device 500 may make a write request to the second device 400, like it does to the first device, to set the Tech Type of the second device to Bluetooth LE (S18060).

Afterwards, the third device 500 may request the second device 400 to write the address of the first device 300 in the Peer Device included in the characteristics of the second device 400 and provide the first device 300's information, in order to control the second device 400 to connect with the first device 300 (S18070).

The third device 500 may request the second device to write in the Service Type in order to set a service to be provided via Bluetooth LE (S18080). For example, when providing object transfer service through a connection with the first device 300, the third device 500 may send a write request message to the second device 400 requesting to set the Service Type to object transfer service.

The third device 500, having set the Service Type, may allow the second device 400 to perform a connecting procedure with the first device 300 by requesting the second device 400 to write in the '0x06' of the Pairing/connection control point (S18090).

Having received an instruction from the third device 500 to send a connection request to the first device 300 by writing in the Pairing/connection control point, the second device 400 may receive an advertising message from the first device (S18100), and then send a connection request message to the first device to form a Bluetooth LE connection with the first device (S18110 and S18120).

FIG. 19 illustrates a further example of a method for controlling a connection between other devices by means of a control device according to an exemplary embodiment of the present invention.

Referring to FIG. 19, the third device, which is a control device, may control the first device to connect with the second device and then, if there is a change in the connection state between the first device and the second device, receive connection state information.

Firstly, the step S19010 and the step S19020 are identical to the steps S18010 and S18020 of FIG. 18, so descriptions thereof will be omitted.

The third device 500 connects with the first device 300 and then, in order to set a device controlling the first device's pairing/connection, requests the first device 300 to write the address of the device controlling the pairing/connection in the Agent Device (S19030).

Hereinafter, the exemplary embodiment of the present invention will be described with respect to an example in which the third device 500 is a device that controls the pairing/connection.

Afterwards, the first device 300 sends to the second device 400 an advertising message including information on services provided by itself (S19040), and the second device 400, having received the advertising message, sends a connection request message to the first device 300 and forms a connection with the first device 300 (S19050 and S19060).

The first device 300's connection state is changed because it has formed a connection with the second device 400. Thus, the first device 300 may send the changed connection state information to the third device, which is set as the agent device, through an indication message (S19070).

The connection state information may include information on the Device State, which indicates the current state of the first device described in FIG. 10, and information on the Peer Device, which includes information on the second device 400, i.e., the other device.

In order for the third device 500 to receive the indication message, the third device 500 has to manage information on bonding with the first device 300 and maintain the connection with the first device 300.

Afterwards, the first device 300 may send a connection termination message to the second device to terminate the connection with the second device 400 (S19080).

The first device 300's connection state is changed because it has terminated the connection with the second device 400. Thus, the first device 300 may send the changed connection state information to the third device 500, which is set as the agent device, through an indication message (S19090).

The connection state information may include information on the Device State, which indicates the current state of the first device described in FIG. 10, and information on the Peer Device, which includes information on the second device 400, i.e., the device with which the first device 300 has terminated the connection.

As explained above, in order for the third device 500 to receive the indication message, the third device 500 has to manage information on bonding with the first device 300 and maintain the connection with the first device 300.

FIG. 20 illustrates a further example of a method for controlling a connection between other devices by means of a control device according to an exemplary embodiment of the present invention.

Referring to FIG. 20, the third device, which is a control device, may set authentication keys for connection on the first device and the second device, respectively, and the first device and the second device may authenticate each other using the set authentication keys.

Firstly, the step S20010 and the step S20020 are identical to the steps S18010 and S18020 of FIG. 18, so descriptions thereof will be omitted.

In a case where the first device 400 supports SSP (Secure Simple Pairing), the third device 500 may request the first device 300 to write a passkey in order to set a passkey to use for the SSP (S20030).

The SSP refers to a method of pairing which uses public key cryptography, rather than the existing PIN code, to facilitate pairing. The passkey is an authentication key used for the SSP, by which devices supporting the SSP may authenticate each other by exchanging their passkeys and comparing them with each other.

Afterwards, the third device 500 may perform a connecting procedure with the second device 400 in order to set a passkey on the second device 400 that will connect with the first device 300.

Firstly, the second device 400 sends an advertising message to the third device 500 like the first device 300 does (S20040). Like the advertising message sent by the first device, the advertising message may include information on services supported by the second device 400, information relating to the second device, information on the role of the first device, and information on the wireless communication technology type supported by the first device.

The advertising message may be sent to the third device 500 in a broadcast or unicast manner.

Afterwards, the third device 500 sends a connection request message in order to form a Bluetooth LE connection with the second device 400 based on the advertising message sent from the second device 400 (S20050).

Afterwards, having connected with the second device 400, the third device 500 requests the second device 400 to write a passkey, in order to set the same passkey as the first device on the second device 400 (S20060).

By this, the second device 400 may have the same passkey as the first device 300 so that it may perform SSP with the first device 300.

Afterwards, the first device 300 sends to the second device 400 an advertising message including information on services provided by itself (S20070), and the second device, having received the advertising message from the first device 300, sends a connection request message to the first device 300 and performs a connecting procedure with the first device 300 (S20080).

The first device 300 and the second device 400 perform an authentication procedure for connection. If the passkey of the first device 300 and the passkey of the second device match, the authentication succeeds: otherwise, it fails (S20090).

With the above method, the control device may set a passkey on devices which are to be controlled for connection, and control an authentication procedure of these other devices.

FIG. 21 illustrates a further example of a method for controlling a connection between other devices by means of a control device according to an exemplary embodiment of the present invention.

Referring to FIG. 21, as opposed to FIG. 20, the first device and the second device may request the third device, which is a control device, to set a passkey and perform an authentication procedure using the set passkey.

Firstly, the step S21010 and the step S21020 are identical to the steps S18010 and S18020 of FIG. 18, so descriptions thereof will be omitted.

Afterwards, the third device 500 receives an advertising message from the second device 400 (S21030).

Like the advertising message sent by the first device, the advertising message may include information on services supported by the second device 400, information relating to the second device, information on the role of the first device, and information on the wireless communication technology type supported by the first device.

The advertising message may be sent to the third device 500 in a broadcast or unicast manner.

Afterwards, the third device 500 sends a connection request message in order to form a Bluetooth LE connection with the second device 400 based on the advertising message sent from the second device 400, and connects with the second device (S21040).

After the first device 300 and the second device 400 are connected to the third device 500, the first device 300 sends to the second device 400 an advertising message including information on services supported by the first device 300 (S21050), and the second device 400 sends a connection request message to the first device 300 in order to connect with the first device 300 (S21060).

Afterwards, the first device 300 and the second device 400 start an authentication procedure for authenticating each other (S21070). The first device 300 requests the third device 500 for a passkey required for authentication in order to perform the authentication procedure (S21080), and the third device 500 writes the passkey in the first device 300 as a response to the request (S21090).

Like the first device 300, the second device 400 requests the third device 500 for a passkey required for authentication in order to perform an authentication procedure (S21100), and the third device 500 writes the passkey in the second device 400 as a response to the request (S21110).

The first device 300 and second device 400 whose passkeys are set by the third device 500 compare their passkeys. If their passkeys match, the authentication succeeds: otherwise, the authentication fails. Then, the authentication procedure is terminated (S21120).

FIG. 22 illustrates a further example of a method for controlling a connection between other devices by means of a control device according to an exemplary embodiment of the present invention.

Referring to FIG. 22, the third device, which is a control device, may control the first device and the second device to connect with each other via a particular wireless communication technology.

Firstly, the steps S22010 to S22040 are identical to the steps S15010 to S15040 of FIG. 15, so descriptions thereof will be omitted.

Having connected with the second device 400, the third device 500 may request the second device 400 to write a particular wireless communication technology in the Tech Type included in the characteristics, in order to set the wireless communication technology type by which the second device 400 will form a connection with the first device 300 (S22050). The following description will be given on the assumption that the wireless communication technology is Wi-Fi.

Having set the Tech Type included in the characteristics to Wi-Fi, the third device 500 may request the second device 400 to write in the '0x06' for the Connection Request of the Pairing/Connecting Control Point, in order to instruct the second device 400 to perform a connecting procedure with the first device 300 via Wi-Fi (S22060).

Having received an instruction from the third device 500 to connect with the first device 300 via Wi-Fi, the second device 400 may connect with the first device 300 via Wi-Fi (S22070).

FIG. 23 illustrates a further example of a method for controlling a connection between other devices by means of a control device according to an exemplary embodiment of the present invention.

Referring to FIG. 23, the third device may control the second device or the first device to make a connection at a specific time.

Firstly, the steps S23010 to S23030 are identical to the steps S15010 to S15030 of FIG. 15, so descriptions thereof will be omitted.

Having connected with the second device 400, the third device 500 may request the second device 400 to write in the Scheduled Time characteristic, in order to set the time at which the second device 400 will send a connection request message (S23040), and request the second device 400 to write in the Pairing/Connection Control Point characteristic, in order to indicate a connection request (S23050).

Afterwards, the second device 400 sends a connection request message to the first device 300 in order to connect with the first device 300 at the time written in the Scheduled Time characteristic (S23060), and connects with the first device (S23070).

FIGS. 24 to 29 illustrate examples of information that may be included in an advertising message for controlling a connection between other devices by means of a control device according to an exemplary embodiment of the present invention.

A Bluetooth LE device periodically sends an advertising message including its device information in order to connect with other Bluetooth LE devices.

Devices controlled through such an advertising message may send their information to a control device, and the control device may acquire various information on the controlled devices through advertising messages sent from the controlled devices.

Such an advertising message may include the following information.

- Service UUID: (InComplete List or Complete List) and (16 bit or 32 bit or 128 bit Service UUID)—Includes a UUID indicating a control service such as Pairing Control or Connection Control Service
- Local Name: Shortened local Name or Complete local name
- Flags: Provide the following information by bitwise operations (Limited Discoverable mode, General Discoverable mode, BR/EDR Not Supported, Simultaneous LE, BR/EDR to Same Device Capable (Controller, Simultaneous LE and BR/EDR to Dame Device Capable (Host))
- Manufacturer Specific Data: 2 octets of data or more
- TxPower Level: 1 octet, (−127~127 dBm)
- Secure Simple Pairing Out of Band (OOB): Mandatory (SSP OOB Length, BD_ADDR), Optional (Class of Device, Simple Pairing Hash C-192, Simple Pairing Randomizer R-192, Simple Pairing Hash C-256, Simple Pairing Randomizer R-256)
- Security Manager Out of Band (OOB): Provides the following information by bitwise operations (LE supported (Host), Simultaneous LE and BR/EDR to Same Device Capable (Host), Address type (0=Public Address, 1=Random Address)
- Security Manager TK Value: 16 octets of information
- Slave Connection Interval Range: 4 octets (2 octets: Conn_Interval_Min, 2 octets: Conn_Interval_Max)
- Service Solicitation: List of 16 bit Service Solicitation UUIDs, List of 32 bit Service Solicitation UUIDs, List of 128 bit Service Solicitation UUIDs
- Service Data: Service Data (16 bit UUID: 2 or more octets, 32 bit UUID: 4 or more octets, 128 bit UUID: 16 bit more octets)
- Appearance: Service Type and Device Type
- Public Target Address: Multiples of 6 octets
- Random Target Address: Multiples of 6 octets
- Advertising Interval: 2 octets (multiples of 0.625 ms)
- LE Bluetooth Device Address: 7 octets (The format of the 6 least significant Octets is the same as the Device Address)
- LE Role: Only Peripheral Role Supported, Only Central Role supported, Peripheral and Central Role supported, Peripheral and Central Role supported
- Agent Device: Control device's information
- Device State: Information on the current operating state or currently operable states of device
- Supported Security: Information on security mode and security level
- Connected Tech. Type: Information on supported wireless communication technology type
- Bonding Information
- Connection Information FIG. 24 illustrates an example of the Agent Device information included in the advertising message. A device controlled through the Agent Device information may broadcast or unicast an advertising message including information on devices which are to be controlled for pairing and/or connection.

FIG. 25 illustrates an example of the Device State information included in the advertising message. As shown in (a) of FIG. 25, the types of the Device State may be divided into Current Device States, which indicates the current state of a device, and Operated Device States, which indicates operable states of the device, which may be distinguished by the Mode of (b) of FIG. 25. For example, if the Mode has a value of '0', it indicates Current Device State, and if the Mode has a value of '1', it indicates Operated Device States.

In this case, if the Mode indicates Current Device State, information on only one state indicating the current state of the device may be provided, and if the Mode indicates Operated Device States, information on a number of states in which the device is currently operable may be provided.

For example, if the Mode indicates Current Device State, only one of the bits indicating the device states listed in (b) of FIG. 25 may be used (the value of a specific bit indicating a state may be '1'), and if the Mode indicates Operated Device States, a number of bits may be used (the value of multiple bits may be '1').

FIG. 26 illustrates an example of the Security included in the advertising message. In this example, the Security Mode and/or Security Level provided by a device may be controlled.

(a) of FIG. 26 illustrates the Security Mode of the device, (b) of FIG. 26 indicates the Security Level of the device, and (c) of FIG. 26 indicates the Security Mode and Security Level of the device.

In the Security Mode and Security Level, it is possible to decide whether to provide the authentication, authorization, encryption, and data signing functions or not. In a process of controlling a connection between two devices, if their Security Modes and/or Security Levels do not match, the control device may the Security Modes and/or Security Levels of the two devices through a Write Message.

FIG. 27 illustrates two examples of the Connection Tech Type included in the advertising message. In these examples, the control device is able to control the communication technology by which the controlled device is connected and to know by which communication technology the controlled device is connected.

The communication technologies listed in FIG. 27 are merely examples, and other various communication technologies may be included.

FIG. 28 illustrates an example of the Bonding Information included in the advertising message. When a device initially makes a connection via Bluetooth LE, the device is connected through a pairing stage. Through the pairing stage, bonding information is stored in the device and the device goes into a bonding state.

Once bonding information is stored in the device, the device may make a re-connection via Bluetooth LE without the pairing stage, as long as it has the bonding information stored in it.

(a) and (b) of FIG. 28 show whether a controlled device supports Bonding Mode or not. By sending an advertising message including information about whether Bonding Mode is supported or not, the control device may find out whether a device that has sent an advertising message supports Bonding Mode or not.

(c) of FIG. 28 illustrates an example of Bonding Information, and Bonding Information may include the following information.

- Bonding List Information—A list of bonded devices
- Length of Bonding Information
- Number of Bonded Devices
- Device Address 1-n: Addresses of bonded devices The Bonding List Information may include, as shown in (d) of FIG. 28, a No List field indicating that there is no list of bonded devices, a Partial List field indicating that only part of a device list is included, and a Complete List field indicating that a complete list of devices is included.

FIG. 29 illustrates an example of the Connection Information included in the advertising message.

(a) and (b) of FIG. 29 show whether a controlled device supports Connection Mode or not. By sending an advertising message including information about whether Connection Mode is supported or not, the control device may find out whether a device that has sent an advertising message supports Connection Mode or not.

(c) of FIG. 29 illustrates an example of Connection Information, and Connection Information may include the following information.

Connection List Information—A list of connected devices
Length of Connection Information
Number of Connected Devices
Device Address 1-n: Addresses of connected devices The Connection List Information may include, as shown in (d) of FIG. 29, a No List field indicating that there is no list of bonded devices, a Partial List field indicating that only part of a device list is included, and a Complete List field indicating that a complete list of devices is included.

The information included in the advertising message described in FIGS. 24 to 29 may be applied according to exemplary embodiments of the present invention.

FIG. 30 illustrates an example of a method for controlling a connection by acquiring other devices' state information through an advertising message according to an exemplary embodiment of the present invention.

Referring to FIG. 30, the third device, which is a control device, may control the first device by acquiring the first device's information from the first device through an advertising message.

Specifically, the first device 300 may send an advertising message to the third device 500 (S30010). The advertising message may include Agent Device information as shown in FIG. 24 and/or Device State information as shown in FIG. 25.

If a specific bit in the Device State information is disabled, the first device does not perform the disabled operation. The following description will be given with respect to an example in which the Scanning bit is disabled.

Afterwards, the third device 500 sends a connection request message to the first device 300 in order to connect with the first device 300 via Bluetooth LE, and is then connected to the first device 300 via Bluetooth LE (S30020).

Afterwards, the third device 500 sends a write request requesting the first device 300 to enable the Scanning feature in the Device State characteristic, in order to activate the Scanning function of the first device 300 (S30030).

According to the write request from the third device 500, the first device 300 enables the Scanning feature, thereby enabling scanning.

Afterwards, the second device 400 may send an advertising message to the third device 500 and the first device 300 (S30040). The advertising message may include Agent Device information as shown in FIG. 24 and/or Device State information as shown in FIG. 25.

In this case, if the Agent Device information in the advertising message sent by the second device 400 includes the address of the first device 300 but does not contain the address of the third device 500, only the first device 300 may control pairing of the second device.

Accordingly, the first device 300 sends a connection request message to the second device 400 to control pairing of the second device 400 (S30050), and the first device 300 controls pairing of the second device (S30060).

FIG. 31 illustrates another example of a method for controlling a connection by acquiring other devices' state information through an advertising message according to an exemplary embodiment of the present invention.

Referring to FIG. 31, if the security modes in the security information of the first and second devices, i.e., controlled devices, do not match, the third device, which is a control device, may match the security modes of the first and second devices so that the first device and the second device are connected through the same security mode.

Specifically, the first device 300 may send an advertising message to the third device 500 (S31010). The advertising message may include security information and supported wireless communication technology information, as shown in FIGS. 26 and 27.

The following description will be given with respect to an example in which the security mode included in the security information is Security mode 4 and the supported wireless communication technology is Bluetooth BR/EDR.

The second device 400, too, sends an advertising message to the third device 500 (S31020). Like the advertising message sent by the first device 300, the advertising message sent by the second device 400 may include security information and supported wireless communication technology information, as shown in FIGS. 26 and 27.

The following description will be given with respect to an example in which the security information included in the advertising message sent by the second device is Security mode 3 and the supported wireless communication technology is Bluetooth BR/EDR.

Afterwards, the third device 500 sends a connection request message to the first device 300 in order to connect with the first device 300 via Bluetooth LE (S31030), and makes a connection with the first device via Bluetooth LE.

The third device 500 may find out that the first device and the second device have different security modes, through the advertising messages sent from the first device 300 and the second device 400.

Accordingly, the third device 500 may request the first device 300 to write security information in order to change the Security mode of the first device 300 to Security mode 3 (S31040).

Having changed the security mode to Security mode 3 by means of the third device 500, the first device 300 pairs with the second device 400 according to the changed security mode (S31050).

FIG. 32 illustrates an example of a method for acquiring other devices' state information through an advertising message according to an exemplary embodiment of the present invention.

Referring to FIG. 32, the third device, which is a control device, may acquire bonding information from the first device and/or second device, which are controlled devices, and if only part of the bonding information is acquired, the third device may acquire the remaining bonding information through a connection.

Specifically, the first device 300 may send an advertising message to the third device 500 (S32010). The advertising message may include Bonding Information as shown in FIG. 28.

The Bonding List information in the Bonding Information may be either Complete List information, Partial List information, or No List information.

This exemplary embodiment will be described below with respect to the Complete List.

Afterwards, the second device 400, too, sends an advertising message to the third device 500 (S32020). Like the advertising message sent by the first device 300, the advertising message sent by the second device 400 may include bonding information, as shown in FIG. 28.

In this case, if not all data can be sent because the length of the advertising message is limited, the second device 400 may send Partial List information—that is, part of the data.

The following description will be given with respect to an example in which the Bonding List information sent by the second device 400 is Partial List information.

Since the third device 500 has received only part of the Bonding List from the second device 400 through the advertising message, it may make a connection with the second device 400 in order to receive the remaining information.

The third device sends a connection request message to the second device 400 in order to connect with the second device 400 via Bluetooth LE (S32030).

The third device 500 is connected to the second device 400 via Bluetooth LE by sending the connection request message, and requests the second device 400 to read the bonding information stored in the GATT database, in order to request the second device 400 to send the remaining bonding information (S32040).

Having been requested to read the bonding information by the third device 500, the second device 400 sends the remaining bonding information to the third device 500 through a read response (S32050).

FIG. 33 illustrates another example of a method for acquiring other devices' state information through an advertising message according to an exemplary embodiment of the present invention.

Referring to FIG. 33, the third device, which is a control device, may acquire connection information from the first device and/or second device, which are controlled devices, and if only part of the connection information is acquired, the third device may acquire the remaining connection information through a connection.

Specifically, the first device 300 may send an advertising message to the third device 500 (S33010). The advertising message may include Connection Information as shown in FIG. 29.

The Connection List information in the Connection Information may be either Complete List information, Partial List information, or No List information.

This exemplary embodiment will be described below with respect to the Complete List information.

Afterwards, the second device 400, too, sends an advertising message to the third device 500 (S33020). Like the advertising message sent by the first device 300, the advertising message sent by the second device 400 may include connection information, as shown in FIG. 29.

In this case, if not all data can be sent because the length of the advertising message is limited, the second device 400 may send Partial List information—that is, part of the data.

The following description will be given with respect to an example in which the Connection List information sent by the second device 400 is Partial List information.

Since the third device 500 has received only part of the Connection List from the second device 400 through the advertising message, it may make a connection with the second device 400 in order to receive the remaining information.

The third device sends a connection request message to the second device 400 in order to connect with the second device 400 via Bluetooth LE (S33030).

The third device 500 is connected to the second device 400 via Bluetooth LE by sending the connection request message, and requests the second device 400 to read the connection information stored in the GATT database, in order to request the second device 400 to send the remaining connection information (S33040).

Having been requested to read the connection information by the third device 500, the second device 400 sends the remaining connection information to the third device 500 through a read response (S33050).

FIGS. 34 and 35 illustrate an example of the data format of and information in an advertising message according to an exemplary embodiment of the present invention.

The packet shown in FIG. 34 illustrates the data format of a scan request message for requesting for additional information in an advertising message. Through the scan request message, a device may request the device that has sent the advertising message for the information shown in FIG. 35.

The following Table 2 shows an example of the Header field format shown in FIG. 34.

TABLE 2

| PDU Type (4 bits) | RFU (2 bits) | TxAdd (1 bit) | RxAdd (1 bit) | Length (6 bits) | RFU (2 bits) |
| --- | --- | --- | --- | --- | --- |

In Table 2, PDU Type indicates the type of the message. In this exemplary embodiment, PDU Type may have a value of '0011' indicating the scan request message of Table 1.

The Scanner's Address field shown in FIG. 34 is a field indicating the address of a device that performs scanning—that is, the address of the device that sends the scan request message.

The Advertiser Address is a field indicating the address of the device that has sent the advertising message—that is, the address of the device that receives the scan request message.

A device may request the device that has sent the advertising message for additional information through the scan request message, and the device that has received the scan request message may send the requested information through a scan response message to be described below.

FIGS. 36 to 38 illustrate an example of the data format of and information in an advertising message for providing a device's state information according to an exemplary embodiment of the present invention.

FIGS. 36 to 38 illustrate an example of the data format of a scan response message. Information requested through a scan request message may be sent through the scan response message.

The Header field of FIG. 36 may have the format shown in Table 2. In this case, the PDU Type may have a value of "0100" indicating the scan response message of Table 1.

Through the scan response message, the device may send the information requested through the scan request message—for example, the information shown in FIGS. 37 and 38.

FIGS. 39 to 41 illustrate an example of a method and data format for acquiring other devices' information by means of a control device according to an exemplary embodiment of the present invention.

Referring to FIGS. 39 to 41, the third device, which is a control device, may acquire information on the first device and/or second device—that is, devices that are controlled through scan request and response messages.

Specifically, the first device 300 and the second device 400 send an advertising message including the first device 300's information and an advertising message including the second device's information respectively to the third device (S39010 and S39020).

The PDU Type of the advertising messages may be 'ADV_INT', and its payload may have the format shown in (a) of FIG. 40.

Having received the advertising messages from the first device 300 and the second device 400, the third device may send a scan request message to the first device 300 and the second device 400 if it wants to request the first device 300 and the second device 400 for additional information (S39030 and S39040). The PDU Type of the advertising messages may be 'SCAN_REQ', and its payload may have the format shown in (b) of FIG. 40.

The additional information may be described with respect to a pairing status.

Afterwards, the first device 300 and the second device 400 may send pairing status data to the third device as requested by the third device, through a scan response message (S39060 and S39070).

The PDU Type of the scan response message may be 'SCAN_RSP', and its payload may have the format shown in (a) of FIG. 41.

The 'PairingStatusData' is a field including pairing information, and may include the information of FIG. 38.

The following Table 3 shows an example of the information included in the 'PairingStatusData'.

TABLE 3

Pairing Status
Type of Pairing(Connection)
Master Device ID
Master Device's GAP Roles
Paired Device's Manufacturer ID
Paired Device's Appearance
Paired Device's Class of Device
Paired Device's Shortened Device Friendly Name
Number of Available Connections
Security Modes
Bonding Information
Profile IDs
Service IDs In Table 3, the 'Master Device's GAP Roles' corresponds to the "Advertiser Device's GAP Roles' of FIG. 38.

Having acquired pairing status data from the first device 300 and the second device 400 through the scan response message, the third device 500 sends a pairing request message to the first device 300 in order to instruct the first device 300 to perform Bluetooth BR/EDR pairing with the second device 400 (S39080).

Having received an instruction from the third device 500 to pair with the second device 400, the first device 300 is connected to the second device 400 by performing Bluetooth BR/EDR pairing with the second device 400 (S39080).

Afterwards, the first device 300 sends the pairing result to the third device 500 through a connection response message (S39090). The connection response message may have the same format as (b) of FIG. 41.

The present invention described as above is not limited by the aforementioned exemplary embodiments and the accompanying drawings because it will be apparent to those skilled in the art that various substitutions, modifications, and changes can be made within the scope without departing from the technical spirit of the present invention.

The invention claimed is:

1. A method for a third device to control a connection between a first device and a second device by using Bluetooth Low Energy (LE) technology, the method comprising:
   receiving from the first device an advertising message including information related to a connection control service;
   connecting with the first device based on the advertising message; and
   requesting the first device to write in characteristics of the first device in order to instruct to perform a specific operation,
   wherein the advertising message includes at least one of role information indicating a role of the first device, bonding information indicating a bonding state, or connection information indicating a connection state, and
   wherein the bonding information includes at least one of mode information indicating whether the first device is bondable, list information indicating a list of bonded devices, number information indicating a number of bonded devices, or address information indicating the addresses of bonded devices.

2. The method of claim 1, wherein the list information includes one of partial list information indicating part of the bonded device list or complete list information indicating all of the bonded device list.

3. The method of claim 2, further comprising:
   transmitting a read request message for requesting remaining list information of the bonded device list based on the connection when the list information includes the partial list information; and
   receiving a read response message including the remaining list information in response to the read request message.

4. The method of claim 1, wherein the connection information includes at least one of mode information indicating whether the first device is connectable, list information indicating a list of connected devices, number information indicating the number of connected devices, or address information indicating the addresses of connected devices.

5. The method of claim 4, wherein the connection list information includes one of partial list information indicating part of the connected device list or complete list information indicating all of the connected device list.

6. The method of claim 5, further comprising:
   transmitting a read request message for requesting remaining list information of the connected device list based on the connection when the list information comprises the partial list information; and
   receiving a read response message including the remaining list information in response to the read request message.

7. The method of claim 1, wherein the advertising message includes at least one of device information indicating a device that controls the first device's connection, state information indicating the first device's state, supported technology information indicating a wireless communication technology supported by the first device, or security information indicating a security level of the first device.

8. The method of claim 1, wherein the specific operation is one of connecting with the second device, changing a state of the first device, or changing a security mode of the first device.

9. The method of claim 8, further comprising:
- requesting the first device to write wireless communication technology information for connection with the second device when the specific operation is connecting with the second device;
- requesting the first device to write the second device's address information; and
- requesting the first device to write service information that the first device wants to provide through a connection with the second device.

10. The method of claim 9, further comprising receiving from the first device connection state information indicating the connection state between the first device and the second device.

11. A third device for controlling a connection between a first device and a second device by using Bluetooth Low Energy (LE) technology, the third device comprising:
- a communication unit configured to communicate with external devices in a wireless or wired manner; and
- a processor functionally connected to the communication unit,
- wherein the processor is configured to:
  - receive from the first device an advertising message including information related to a connection control service,
  - connect with the first device based on the advertising message, and
  - control the communication unit to request the first device to write in characteristics of the first device in order to instruct to perform a specific operation,
- wherein the advertising message includes at least one of role information indicating a role of the first device, bonding information indicating a bonding state, or connection information indicating a connection state, and
- wherein the bonding information includes at least one of mode information indicating whether the first device is bondable, list information indicating a list of bonded devices, number information indicating a number of bonded devices, or address information indicating the addresses of bonded devices.

12. The device of claim 11, wherein the list information includes one of partial list information indicating part of the bonded device list or complete list information indicating all of the bonded device list.

13. The device of claim 12, wherein, when the list information includes the partial list information, the processor transmits a read request message for requesting remaining list information of the bonded device list based on the connection, and receives a read response message including the remaining list information in response to the read request message.

14. The device of claim 11, wherein the connection information includes at least one of mode information indicating whether the first device is connectable, list information indicating a list of connected devices, number information indicating the number of connected devices, or address information indicating the addresses of connected devices.

15. The device of claim 14, wherein the connection list information includes one of partial list information indicating part of the connected device list or complete list information indicating all of the connected device list.

16. The device of claim 15, wherein, when the connection list information includes the partial list information, the processor controls the communication unit to transmit a read request message for requesting remaining list information of the connected device list based on the connection, and controls the communication unit to receive a read response message including the remaining list information in response to the read request message.

17. The device of claim 11, wherein the advertising message includes at least one of device information indicating a device that controls the first device's connection, state information indicating the first device's state, supported technology information indicating a wireless communication technology supported by the first device, or security information indicating a security level of the first device.

18. The device of claim 11, wherein the specific operation is one of connecting with the second device, changing a state of the first device, or changing a security mode of the first device.

* * * * *